(12) United States Patent
Srnec

(10) Patent No.: US 10,875,497 B2
(45) Date of Patent: Dec. 29, 2020

(54) DRIVE OFF PROTECTION SYSTEM AND METHOD FOR PREVENTING DRIVE OFF

(71) Applicant: THERMO KING CORPORATION, Minneapolis, MN (US)

(72) Inventor: Matthew Srnec, Minnetonka, MN (US)

(73) Assignee: Thermo King Corporation, Minneapolis, MN (US)

( * ) Notice: Subject to any disclaimer, the term of this patent is extended or adjusted under 35 U.S.C. 154(b) by 97 days.

(21) Appl. No.: 16/176,667

(22) Filed: Oct. 31, 2018

(65) Prior Publication Data

US 2020/0130645 A1  Apr. 30, 2020

(51) Int. Cl.
*B60R 25/08* (2006.01)
*B60H 1/00* (2006.01)
(Continued)

(52) U.S. Cl.
CPC ......... *B60R 25/08* (2013.01); *B60H 1/00364* (2013.01); *B60L 1/003* (2013.01); *B60P 3/20* (2013.01); *B60Q 1/50* (2013.01); *B60Q 5/005* (2013.01); *B60Q 9/00* (2013.01); *B60R 16/033* (2013.01); *B60R 25/04* (2013.01); *B60T 1/02* (2013.01); *B60T 8/1708* (2013.01);
(Continued)

(58) Field of Classification Search
CPC ....... B60R 25/08; B60R 16/033; B60R 25/04; B60Q 9/00; B60Q 5/005; B60Q 1/50; F25D 11/003; B60T 1/02; B60T 8/1708; B60H 1/00364; B60L 1/003; B60P 3/20; B65G 69/28; B60Y 2300/91
See application file for complete search history.

(56) References Cited

U.S. PATENT DOCUMENTS 3,875,483 A  4/1975 Farr
5,104,037 A  4/1992 Karg et al.
(Continued)

FOREIGN PATENT DOCUMENTS

CN  2456117   10/2001
CN  1885660   12/2006
(Continued)

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.
(Continued)

*Primary Examiner* — Rodney A Butler
(74) *Attorney, Agent, or Firm* — Hamre, Schumann, Mueller & Larson, P.C.

(57) ABSTRACT

A method for preventing drive off of a refrigerated transport unit includes detecting whether an electrical power system of the refrigerated transport unit is electrically connected to a utility power source, and performing an action when the electrical power system is electrically connected to the utility power source includes. A drive off protection system includes a refrigerated transport unit including an electrical power system and a controller that monitors the electrical power system. The controller configured to perform an action when the electrical power system is electrically connected to the refrigerated transport unit.

21 Claims, 8 Drawing Sheets

(51) Int. Cl.

| | | |
|---|---|---|
| *B60L 1/00* | (2006.01) | |
| *B60P 3/20* | (2006.01) | |
| *B60Q 1/50* | (2006.01) | |
| *B60Q 5/00* | (2006.01) | |
| *B60Q 9/00* | (2006.01) | |
| *B60R 16/03* | (2006.01) | |
| *B60R 25/04* | (2013.01) | |
| *B60T 1/02* | (2006.01) | |
| *B60T 8/17* | (2006.01) | |
| *B65G 69/28* | (2006.01) | |
| *F25D 11/00* | (2006.01) | |
| *B60R 16/033* | (2006.01) | |

(52) U.S. Cl.
CPC .......... *B65G 69/28* (2013.01); *F25D 11/003* (2013.01); *B60Y 2300/91* (2013.01)

(56) References Cited

U.S. PATENT DOCUMENTS

| | | | |
|---|---|---|---|
| 5,231,849 A | 8/1993 | Rosenblatt | |
| 6,280,320 B1 | 8/2001 | Paschke et al. | |
| 6,487,869 B1 | 12/2002 | Sulc et al. | |
| 6,518,727 B2 | 2/2003 | Oomura et al. | |
| 6,560,980 B2 | 5/2003 | Gustafson et al. | |
| 6,600,237 B1 | 7/2003 | Meissner | |
| 6,631,080 B2 | 10/2003 | Trimble et al. | |
| 6,652,330 B1 | 11/2003 | Wasilewski | |
| 6,688,125 B2 | 2/2004 | Okamoto et al. | |
| 6,753,692 B2 | 6/2004 | Toyomura et al. | |
| 6,925,826 B2 | 8/2005 | Hille et al. | |
| 7,011,902 B2 | 3/2006 | Pearson | |
| 7,120,539 B2 | 10/2006 | Krull et al. | |
| 7,122,923 B2 | 10/2006 | Lafontaine et al. | |
| 7,151,326 B2 | 12/2006 | Jordan | |
| 7,176,658 B2 | 2/2007 | Quazi et al. | |
| 7,206,692 B2 | 4/2007 | Beesley et al. | |
| 7,327,123 B2 | 2/2008 | Faberman et al. | |
| 7,424,343 B2 | 9/2008 | Kates | |
| 7,449,798 B2 | 11/2008 | Suzuki et al. | |
| 7,532,960 B2 | 5/2009 | Kumar | |
| 7,728,546 B2 | 6/2010 | Tanaka et al. | |
| 7,730,981 B2 | 6/2010 | McCabe et al. | |
| 7,745,953 B2 | 6/2010 | Puccetti et al. | |
| 7,806,796 B2 | 10/2010 | Zhu | |
| 7,830,117 B2 | 11/2010 | Ambrosio et al. | |
| 7,898,111 B1 | 3/2011 | Pistel | |
| 7,900,462 B2 | 3/2011 | Hegar et al. | |
| 8,020,651 B2 | 9/2011 | Zillmer et al. | |
| 8,030,880 B2 | 10/2011 | Alston et al. | |
| 8,134,339 B2 | 3/2012 | Burlak et al. | |
| 8,170,886 B2 | 5/2012 | Luff | |
| 8,214,141 B2 | 7/2012 | Froeberg | |
| 8,295,950 B1 | 10/2012 | Wordsworth et al. | |
| 8,381,540 B2 | 2/2013 | Alston | |
| 8,441,228 B2 | 5/2013 | Brabee | |
| 8,476,872 B2 | 7/2013 | Truckenbrod et al. | |
| 8,487,458 B2 | 7/2013 | Steele et al. | |
| 8,541,905 B2 | 9/2013 | Brabee | |
| 8,602,141 B2 | 12/2013 | Yee et al. | |
| 8,626,367 B2 | 1/2014 | Krueger et al. | |
| 8,626,419 B2 | 1/2014 | Mitchell et al. | |
| 8,643,216 B2 | 2/2014 | Lattin | |
| 8,643,217 B2 | 2/2014 | Gietzold et al. | |
| 8,670,225 B2 | 3/2014 | Nunes | |
| 8,723,344 B1 | 5/2014 | Dierickx | |
| 8,760,115 B2 | 6/2014 | Kinser et al. | |
| 8,764,469 B2 | 7/2014 | Lamb | |
| 8,818,588 B2 | 8/2014 | Ambrosio et al. | |
| 8,862,356 B2 | 10/2014 | Miller | |
| 8,912,683 B2 | 12/2014 | Dames et al. | |
| 8,924,057 B2 | 12/2014 | Kinser et al. | |
| 8,978,798 B2 | 5/2015 | Dalum et al. | |
| 9,030,336 B2 | 5/2015 | Doyle | |
| 9,061,680 B2 | 6/2015 | Dalum | |
| 9,093,788 B2 | 7/2015 | Lamb | |
| 9,102,241 B2 | 8/2015 | Brabee | |
| 9,147,335 B2 | 9/2015 | Raghunathan et al. | |
| 9,199,543 B2 | 12/2015 | Brabee | |
| 9,313,616 B2 | 4/2016 | Mitchell et al. | |
| 9,436,853 B1 | 9/2016 | Meyers | |
| 9,440,507 B2 | 9/2016 | Giovanardi et al. | |
| 9,463,681 B2 | 10/2016 | Olaleye et al. | |
| 9,464,839 B2 | 10/2016 | Rusignuolo et al. | |
| 9,557,100 B2 | 1/2017 | Chopko et al. | |
| 9,562,715 B2 | 2/2017 | Kandasamy | |
| 9,694,697 B2 | 7/2017 | Brabee | |
| 9,738,160 B2 | 8/2017 | Bae et al. | |
| 9,758,013 B2 | 9/2017 | Steele | |
| 9,783,024 B2 | 10/2017 | Connell et al. | |
| 9,784,780 B2 | 10/2017 | Loftus et al. | |
| 9,825,549 B2 | 11/2017 | Choi et al. | |
| 9,846,086 B1 | 12/2017 | Robinson et al. | |
| 9,893,545 B2 | 2/2018 | Bean | |
| 9,931,960 B2 | 4/2018 | Tabatowski-Bush et al. | |
| 9,975,403 B2 | 5/2018 | Rusignuolo et al. | |
| 9,975,446 B2 | 5/2018 | Weber et al. | |
| 9,987,906 B2 | 6/2018 | Kennedy | |
| 10,000,122 B2 | 6/2018 | Wu et al. | |
| 10,148,212 B2 | 12/2018 | Schumacher et al. | |
| 10,240,847 B1 | 3/2019 | Thomas, Jr. | |
| 2002/0113576 A1 | 8/2002 | Oomura et al. | |
| 2003/0043607 A1 | 3/2003 | Vinciarelli et al. | |
| 2003/0106332 A1 | 6/2003 | Okamoto et al. | |
| 2003/0200017 A1 | 10/2003 | Capps et al. | |
| 2005/0057210 A1 | 3/2005 | Ueda et al. | |
| 2005/0065684 A1 | 3/2005 | Larson et al. | |
| 2006/0284601 A1 | 12/2006 | Salasoo et al. | |
| 2007/0052241 A1 | 3/2007 | Pacy | |
| 2007/0192116 A1 | 8/2007 | Levitt | |
| 2008/0177678 A1 | 7/2008 | Di Martini et al. | |
| 2008/0281473 A1 | 11/2008 | Pitt | |
| 2009/0121798 A1 | 5/2009 | Levinson | |
| 2009/0126901 A1 | 5/2009 | Heger et al. | |
| 2009/0178424 A1 | 7/2009 | Hwang et al. | |
| 2009/0195349 A1 | 8/2009 | Frader-Thompson et al. | |
| 2009/0314019 A1 | 12/2009 | Fujimoto et al. | |
| 2009/0320515 A1 | 12/2009 | Bischofberger et al. | |
| 2010/0045105 A1 | 2/2010 | Bovio et al. | |
| 2010/0230224 A1 | 9/2010 | Hindman | |
| 2010/0312425 A1 | 12/2010 | Obayashi et al. | |
| 2010/0320018 A1 | 12/2010 | Gwozdek et al. | |
| 2011/0000244 A1 | 1/2011 | Reason et al. | |
| 2011/0114398 A1 | 5/2011 | Bianco | |
| 2011/0162395 A1 | 7/2011 | Chakiachvili et al. | |
| 2011/0208378 A1 | 8/2011 | Krueger et al. | |
| 2011/0224841 A1 | 9/2011 | Profitt-Brown et al. | |
| 2011/0241420 A1 | 10/2011 | Hering et al. | |
| 2011/0290893 A1 | 12/2011 | Steinberg | |
| 2012/0000212 A1 | 1/2012 | Sanders et al. | |
| 2012/0116931 A1 | 5/2012 | Meyers | |
| 2012/0198866 A1 | 8/2012 | Zeidner | |
| 2012/0310416 A1 | 12/2012 | Tepper et al. | |
| 2013/0000342 A1 | 1/2013 | Blasko et al. | |
| 2013/0088900 A1 | 4/2013 | Park | |
| 2013/0158828 A1 | 6/2013 | McAlister | |
| 2013/0231808 A1 | 9/2013 | Flath et al. | |
| 2014/0018969 A1 | 1/2014 | Forbes, Jr. | |
| 2014/0026599 A1 | 1/2014 | Rusignuolo et al. | |
| 2014/0060097 A1 | 3/2014 | Perreautt | |
| 2014/0137590 A1 | 5/2014 | Chopko et al. | |
| 2014/0230470 A1 | 8/2014 | Cook | |
| 2014/0265560 A1 | 9/2014 | Leehey et al. | |
| 2015/0019132 A1 | 1/2015 | Gusikhin et al. | |
| 2015/0081212 A1 | 3/2015 | Mitchell et al. | |
| 2015/0121923 A1 | 5/2015 | Rusignuolo et al. | |
| 2015/0168032 A1 | 6/2015 | Steele | |
| 2015/0188360 A1 | 7/2015 | Doane et al. | |
| 2015/0316301 A1 | 11/2015 | Kolda et al. | |
| 2015/0345958 A1 | 12/2015 | Graham | |
| 2015/0355288 A1 | 12/2015 | Yokoyama et al. | |
| 2015/0360568 A1 | 12/2015 | Champagne et al. | |
| 2016/0011001 A1 | 1/2016 | Emory et al. | |

(56) References Cited

U.S. PATENT DOCUMENTS

| | | |
|---|---|---|
| 2016/0035152 A1* | 2/2016 | Kargupta .............. G06F 16/955 701/31.5 |
| 2016/0089994 A1 | 3/2016 | Keller et al. |
| 2016/0252289 A1 | 9/2016 | Feng et al. |
| 2016/0280040 A1 | 9/2016 | Connell et al. |
| 2016/0285416 A1 | 9/2016 | Tiwari et al. |
| 2016/0291622 A1 | 10/2016 | Al-Mohssen et al. |
| 2016/0327921 A1 | 11/2016 | Ribbich et al. |
| 2016/0377309 A1 | 12/2016 | Abiprojo et al. |
| 2017/0030728 A1 | 2/2017 | Baglino et al. |
| 2017/0057323 A1 | 3/2017 | Neu et al. |
| 2017/0063248 A1 | 3/2017 | Lee et al. |
| 2017/0098954 A1 | 4/2017 | Ferguson et al. |
| 2017/0217280 A1 | 8/2017 | Larson et al. |
| 2017/0259764 A1 | 9/2017 | Da Silva Carvalho et al. |
| 2017/0302200 A1 | 10/2017 | Marcinkiewicz |
| 2017/0349078 A1 | 12/2017 | Dziuba et al. |
| 2018/0022187 A1 | 1/2018 | Connell et al. |
| 2018/0029436 A1 | 2/2018 | Zaeri et al. |
| 2018/0029488 A1 | 2/2018 | Sjödin |
| 2018/0087813 A1 | 3/2018 | Senf, Jr. |
| 2018/0111441 A1 | 4/2018 | Menard et al. |
| 2018/0154723 A1 | 6/2018 | Anderson et al. |
| 2018/0201092 A1 | 7/2018 | Ahuja et al. |
| 2018/0203443 A1 | 7/2018 | Newman |
| 2018/0222278 A1 | 8/2018 | Mizuma |
| 2018/0342876 A1 | 11/2018 | Agnew et al. |
| 2018/0342877 A1 | 11/2018 | Yoo et al. |
| 2018/0356870 A1* | 12/2018 | Rusignuolo .......... B60H 1/3232 |
| 2019/0086138 A1 | 3/2019 | Chopko et al. |
| 2019/0092122 A1* | 3/2019 | Vanous .............. B60H 1/00428 |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0283541 A1 | 9/2019 | Adetola et al. |
| 2020/0050753 A1 | 2/2020 | Davis et al. |
| 2020/0086744 A1 | 3/2020 | Schumacher et al. |
| 2020/0101820 A1 | 4/2020 | Wenger et al. |

FOREIGN PATENT DOCUMENTS

| | | |
|---|---|---|
| CN | 2912069 | 6/2007 |
| CN | 101713577 | 5/2010 |
| CN | 2002038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 2942216 | 11/2015 |
| EP | 3343728 | 7/2018 |
| EP | 536552 | 9/2019 |
| EP | 3540340 | 9/2019 |
| GB | 2551999 | 1/2018 |
| JP | 2000158930 | 6/2000 |
| JP | 2007320352 | 12/2007 |
| JP | 2009243780 | 10/2009 |
| JP | 2019145521 | 8/2019 |
| KR | 10-2012-0092834 | 8/2012 |
| WO | 03038988 | 5/2003 |
| WO | 2008/153518 | 12/2008 |
| WO | 2009/155941 | 12/2009 |
| WO | 2010065476 | 6/2010 |
| WO | 2011066468 | 6/2011 |
| WO | 2012/138500 | 10/2012 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016/038838 | 3/2016 |
| WO | 2016145107 | 9/2016 |
| WO | 2017058660 | 4/2017 |
| WO | 2017/083333 | 5/2017 |
| WO | 2017/083336 | 5/2017 |
| WO | 2017/151698 | 9/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | Z017189485 | 11/2017 |
| WO | 2017218909 | 12/2017 |
| WO | 2017218910 | 12/2017 |
| WO | 2017218912 | 12/2017 |
| WO | 2018/017450 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

"Lamberet Smart Reefer on Solutrans", Zoeken, Jul. 28, 2015, 7 pages, available at: https://iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

U.S. Appl. No. 16/565,063, titled "System and Method for Managing Power and Efficiently Sourcing a Variable Voltage for a Transport Climate Control System ", filed Sep. 9, 2019, 59 pages.

U.S. Appl. No. 16/574,754, titled "Methods and Systems for Energy Management of a Transport Climate Control System", filed Sep. 18, 2019, 50 pages.

U.S. Appl. No. 16/574,775, titled "Methods and Systems for Power and Load Management of a Transport Climate Control System", filed Sep. 18, 2019, 68 pages.

European Patent Application No. 18382672.6, titled "Methods and Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

(56) References Cited

OTHER PUBLICATIONS

U.S. Appl. No. 16/176,802, titled "Methods and Systems for Controlling a Mild Hybrid System That Powers a Transport Climate Control System", filed Oct. 31, 2018, 31 pages.
U.S. Appl. No. 16/236,938, titled "Systems and Methods for Smart Load Shedding of a Transport Vehicle While in Transit", filed Dec. 31, 2018, 39 pages.
U.S. Appl. No. 16/176,720, titled "Methods and Systems for Augmenting a Vehicle Powered Transport Climate Control System", filed Oct. 31, 2018, 41 pages.
U.S. Appl. No. 16/176,602, titled "Reconfigurable Utility Power Input With Passive Voltage Booster", filed Oct. 31, 2018, 39 pages.
U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.
U.S. Appl. No. 16/235,865, titled "Methods and Systems for Preserving Autonomous Operation of a Transport Climate Control System", filed Dec. 28, 2018, 41 pages.
PCT International Application No. PCT/US2018/068136, titled "Methods and Systems for Providing Predictive Energy Consumption Feedback for Powering a Transport Climate Control System", filed Dec. 31, 2018, 34 pages.
PCT International Application No. PCT/US2018/068129, titled "Methods and Systems for Notifying and Mitigating a Suboptimal Event Occurring in a Transport Climate Control System", filed Dec. 31, 2018, 44 pages.
PCT International Application No. PCT/US2018/068139, titled "Methods and Systems for Providing Feedback for a Transport Climate Control System", filed Dec. 31, 2018, 37 pages.
PCT International Application No. PCT/US2018/068142, titled "Methods and Systems for Providing Predictive Energy Consumption Feedback for Powering a Transport Climate Control System Using External Data", filed Dec. 31, 2018, 39 pages.

U.S. Appl. No. 16/911,692, titled "Climate Controlled Vehicle, Transport Climate Control Equipment, Method of Retrofitting a Vehicle and Method of Operation", filed Jun. 25, 2020, 39 pages.
U.S. Appl. No. 16/565,110, titled "Transport Climate Control System With a Self-Configuring Matrix Power Converter", filed Sep. 9, 2019, 52 pages.
U.S. Appl. No. 16/565,146, titled "Optimized Power Management for a Transport Climate Control Energy Source", filed Sep. 9, 2019, 53 pages.
U.S. Appl. No. 62/897,833, titled "Optimized Power Distribution to Transport Climate Control Systems Amongst One or More Electric Supply Equipment Stations ", filed Sep. 9, 2019, 41 pages.
European Patent Application No. 19382776.3, titled "Mprioritized Power Delivery for Facilitating Transport Climate Control", filed Sep. 9, 2019, 41 pages.
U.S. Appl. No. 16/565,205, titled "Transport Climate Control System With an Accessory Power Distribution Unit for Managing Transport Climate Control Loads", filed Sep. 9, 2019, 54 pages.
U.S. Appl. No. 16/565,235, titled "Interface System for Connecting a Vehicle and a Transport Climate Control System", filed Sep. 9, 2019, 64 pages.
U.S. Appl. No. 16/565,252, titled "Demand-Side Power Distribution Management for a Plurality of Transport Climate Control Systems", filed Sep. 9, 2019, 44 pages.
U.S. Appl. No. 16/565,282, titled "Optimized Power Cord for Transferring Power to a Transport Climate Control System", filed Sep. 9, 2019, 43 pages.
U.S. Appl. No. 16/147,708, titled "Methods and Systems for Autonomous Climate Control Optimization of a Transport Vehicle", filed Sep. 29, 2018, 41 pages.
Extended European Search Report, issued in the corresponding European patent application No. 19205713.1, dated Apr. 22, 2020, 7 pages.

\* cited by examiner

DRIVE OFF PROTECTION SYSTEM AND METHOD FOR PREVENTING DRIVE OFF

FIELD

This disclosure generally relates to transport climate control systems. More specifically, this disclosure relates to a transport climate control system that is configured to utilize external power from a utility power source while a refrigerated transport unit utilizing the transport climate control system is parked.

BACKGROUND

A transport climate control system is generally used to control an environmental condition (e.g., temperature, humidity, air quality, and the like) within a transport unit (e.g., a container (such as a container on a flat car, an intermodal container, etc.), a truck, a box car, or other similar transport unit). A refrigerated transport unit is commonly used to transport perishable items such as produce, frozen foods, and meat products. Generally, the refrigerated transport unit includes a transport unit and a transport climate control system.

The transport climate control system includes a transport refrigeration unit (TRU) that is attached to the transport unit to control one or more environmental conditions (e.g., temperature, humidity, atmosphere, etc.) of a particular space (e.g., a cargo space, a passenger space, etc.) (generally referred to as an "internal space"). The TRU can include, without limitation, a compressor, a condenser, an expansion valve, an evaporator, fans and/or blowers to control a heat exchange between air inside the internal space and the ambient air outside of the refrigerated transport unit.

SUMMARY

This application is directed to systems and methods for preventing drive off of a refrigerated transport unit while connected to a utility power source.

In an embodiment, a refrigerated transport unit includes a transport climate control system, a transport unit with an internal space for storing goods to be climate controlled during transport, and an electrical power system. The transport climate control system can include a transport refrigeration unit (TRU) to condition the internal space. The electrical power system is configured to receive external power from the utility power source and provide electrical power to the transport climate control system.

In an embodiment, a method for preventing drive off of a refrigerated transport unit includes detecting whether an electrical power system of the refrigerated transport unit is connected to a utility power source. The method also includes performing an action when the electrical power system is electrically connected to the utility power source.

In an embodiment, the method also includes generating an instruction to prevent movement of the refrigerated transport unit while the electrical power system is connected to the utility power source. The instruction is generated when the electrical power system is connected to the utility power source. The method further includes communicating the instruction to a tow vehicle when the tow vehicle is attached to the refrigerated transport unit. The instruction is configured to prevent the refrigerated transport unit from moving while the electrical power system of the refrigerated transport unit is connected to the utility power source.

In an embodiment, a drive off protection system includes a refrigerated transport unit. The refrigerated transport unit includes a transport unit with an internal space for storing cargo, a transport climate control system configured to control an environmental condition of the internal space, an electric power system, and a controller. The electric power system is configured to receive external electric power (e.g., from a utility power source) and provide electrical power to the transport climate control system. The controller monitors the electrical power system and is configured to perform an action when the electrical power system is electrically connected to the utility power source.

In an embodiment, the controller is configured to generate an instruction when the electrical power system is connected to the utility power source. The instruction is configured to prevent movement of the refrigerated transport unit while the electrical power system is connected to the utility power source.

In an embodiment, the drive off protection system includes a tow vehicle that is attached to the refrigerated transport unit. The controller of the refrigerated transport unit is configured to communicate the instruction to the tow vehicle, and the instruction is configured to prevent the tow vehicle from moving while the electrical power system is electrically connected to the utility power source.

In an embodiment, the electrical power system of the transport refrigeration unit is connected to the utility power source by a physical connection. In another embodiment, the electrical power system of the refrigerated transport unit is connected to the utility power source by a wireless connection.

BRIEF DESCRIPTION OF THE DRAWINGS

References are made to the accompanying drawings that form a part of this disclosure, and which illustrate embodiments in which methods and systems for preventing drive off of a refrigerated transport unit described in this specification can be practiced.

Like numbers refer to similar features throughout.

DETAILED DESCRIPTION

A refrigerated transport unit includes a transport unit with an internal space for storing cargo, a transport climate control system for providing climate control of the internal space, and an electrical power system. The refrigerated transport unit is moved between locations by a tow vehicle attached to the refrigerated transport unit. The electrical power system supplies electrical power to electrical components of the transport climate control system. When parked, the electrical power system is configured to receive external power from a utility power source. However, tow vehicles are able to tow away a refrigerated transport unit while its electrical power system is still physically connected to the external power source. This can cause damage to the refrigerated transport unit and/or the utility power source.

Embodiments described herein are directed to refrigerated transport units, drive off protection systems, and methods for preventing drive off of a refrigerated transport unit. Embodiments described herein are configured to prevent refrigerated transport unit(s) from being towed away while still physically connected to a utility power source. In some embodiments, an instruction to prevent movement of the refrigerated transport unit is generated when the electrical power system of the transport climate control system is connected to the utility power source.

Figure 1:
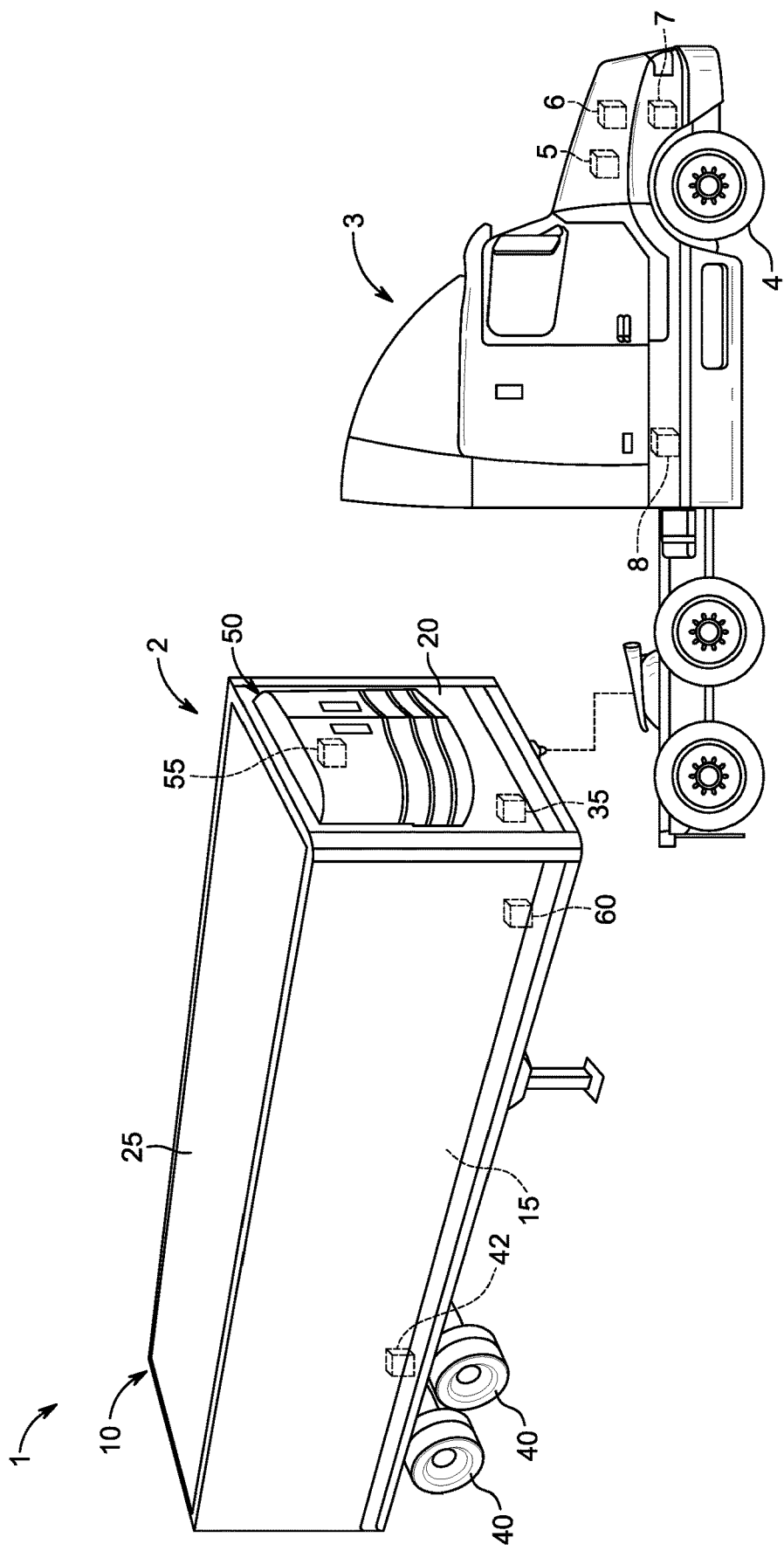
FIG. 1 is a prospective view of a refrigerated transport unit and a tow vehicle, according to an embodiment.

FIG. 1 is a prospective view of a refrigerated transport unit 1 and a tow vehicle 3. The refrigerated transport unit 1 includes a transport climate control system ("TCCS") 2 and a transport unit 10. The TCCS 2 includes a transport refrigeration unit ("TRU") 50. The transport unit 10 includes an internal space 15 for storing cargo and wheels 40 for moving the transport unit 10 along the ground. The transport unit 10 includes a braking system 42 for the wheels 40. When activated, the braking system 42 is configured to prevent the wheels 40 from rotating and prevent movement of the transport unit 10. It will be appreciated that in some embodiments, the transport unit 10 may be a container that sits on a chassis with the braking system 42 and the wheels 40 being part of the chassis.

The TRU 50 is configured to condition (e.g., provide temperature control, humidity control, air quality control, etc.) the internal space 15 of the transport unit 10. For example, the TRU 50 may keep the internal space 15 of the transport unit 10 at or within a desired temperature and/or humidity to prevent the cargo within the internal space 15 from being damaged or spoiled. The TRU 50 is attached to the front 20 of the transport unit 10 in FIG. 1. However, in other embodiments, the TRU 50 may be attached to a roof 25 or a different side of the transport unit 10.

The refrigerated transport unit 1 includes a programmable controller 55 and a battery pack 35. The controller 55 may be a single integrated control unit or a control unit formed by a distributed network of control elements 55, 60. In an embodiment, the controller 55 may be disposed in and/or configured to operate the TRU 50 and its components. The battery pack 35 is configured to store electrical power and supply the electrical power to one or more components of the refrigerated transport unit 1. For example, the battery pack 35 may provide the electrical power for operating the TRU 50 and/or the controller 55. The battery pack 35 is disposed in the transport unit 10 in FIG. 1. However, the battery pack 35 may be disposed outside of the transport unit 10 and/or within the TRU 50 in other embodiments.

As shown in FIG. 1, the transport unit 10 is configured to be attached and moved by the tow vehicle 3. The tow vehicle 3 is attached to the transport unit 10 of the refrigerated transport unit 1 and tows refrigerated transport unit 1 while in transit. The tow vehicle 3 includes wheels 4, a programmable controller 5, a prime mover 6, and a braking system 7. The controller 5 may be a single integrated unit or a network of control elements as similarly discussed regarding the controller 55 of the refrigerated transport unit 1. The controller 5 is configured to control operation of the tow vehicle 3 including the prime mover 6 and the braking system 7. In an embodiment, the prime mover 6 is a diesel engine. The braking system 7 is configured to stop and/or prevent rotation of the wheels 4. The tow vehicle 3 may optionally include a battery pack 8. For example, the tow vehicle 3 in an embodiment may be an electric vehicle or hybrid vehicle and the prime mover 6 may be or include an electric motor powered by the battery pack 8.

The tow vehicle 5 in FIG. 1 is a road tractor. However, it should be appreciated that the tow vehicle 5 may be a different type of vehicle configured for towing the refrigerated transport unit 1. For example, the tow vehicle 5 in an embodiment may be yard tractor, drone, or other type of vehicle configured to tow the refrigerated transport unit 1 between different locations.

Figure 2:
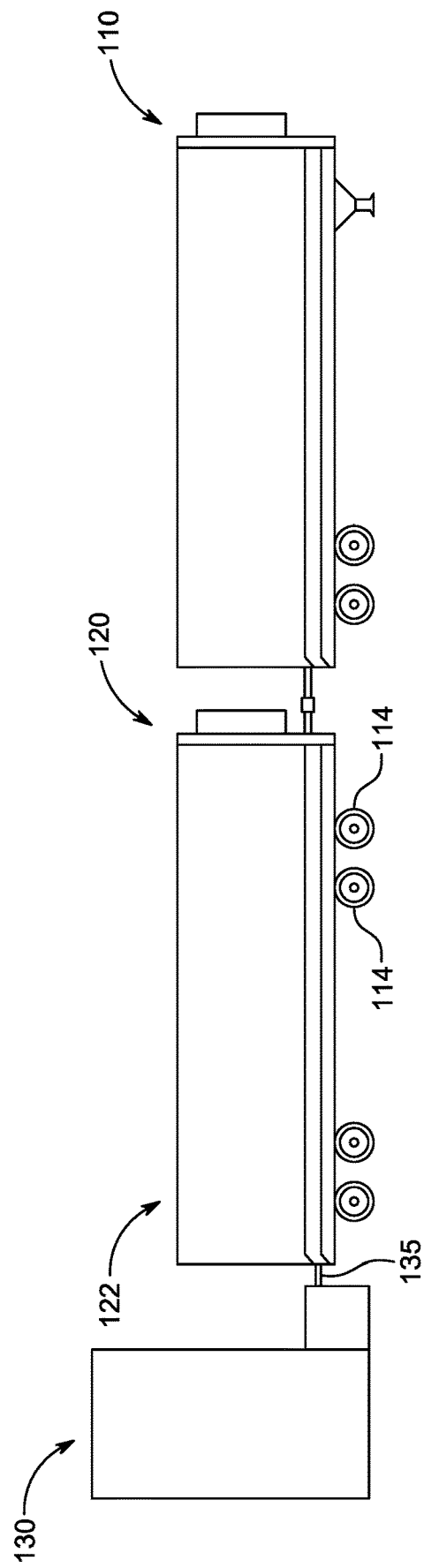
FIG. 2 is a side prospective view of two refrigerated transport units parked at a docking port, according to an embodiment.

FIG. 2 is a side prospective view of a front refrigerated transport unit 110, a rear refrigerated transport unit 120, and a docking port 130. Each refrigerated transport unit 110, 120 in FIG. 2 has a similar configuration as the refrigerated transport unit 1 discussed above, except that the transport unit 122 of the rear refrigerated transport unit 120 includes a front pair of wheels 114 as the rear refrigerated transport unit 120 is directly attached the front refrigerated transport unit 110 instead of a tow vehicle (e.g., the tow vehicle 5 in FIG. 1). The front pair of wheels 114 is directly attached on the transport unit 122 in FIG. 2. However, in other embodiments, the front pair of wheels 114 may be part of a dolly (not shown) that is attached to transport unit 122. In an embodiment, the dolly may provide the front pair of wheels 114 and can be used for attaching the rear refrigerated transport unit 120 to the front refrigerated transport unit 110.

The transport unit 122 is parked at a docking port 130. For example, the docking port 130 may be a facility (e.g., a warehouse, building, etc.) for offloading cargo from transport units and/or for parking transport units. In an embodiment, the docking port 130 may be a charging station for charging parked refrigerated transport units. In such an embodiment, the charging station can include a power source (e.g., the utility power source 260) for providing external power to the docking port 130. For example, the docking port 130 may be a yard for parking and charging refrigerated transport units 110, 120. The docking port 130 includes an attachment arm 135. The attachment arm 135 is configured to attach a transport unit 122 to the docking port 130 when engaged. When engaged, the attachment arm 135 is configured to prevent the attached transport unit 122 from leaving the docking port 130. In an embodiment, the attachment arm 135 may be a different type of restraining device configured to prevent the refrigerated transport unit from leaving the docking port 130. For example, the attachment arm 135 may include a restraining device located on and/or in the ground near the docking port 130, and that physically restrains the refrigerated transport unit from moving.

Figure 3:
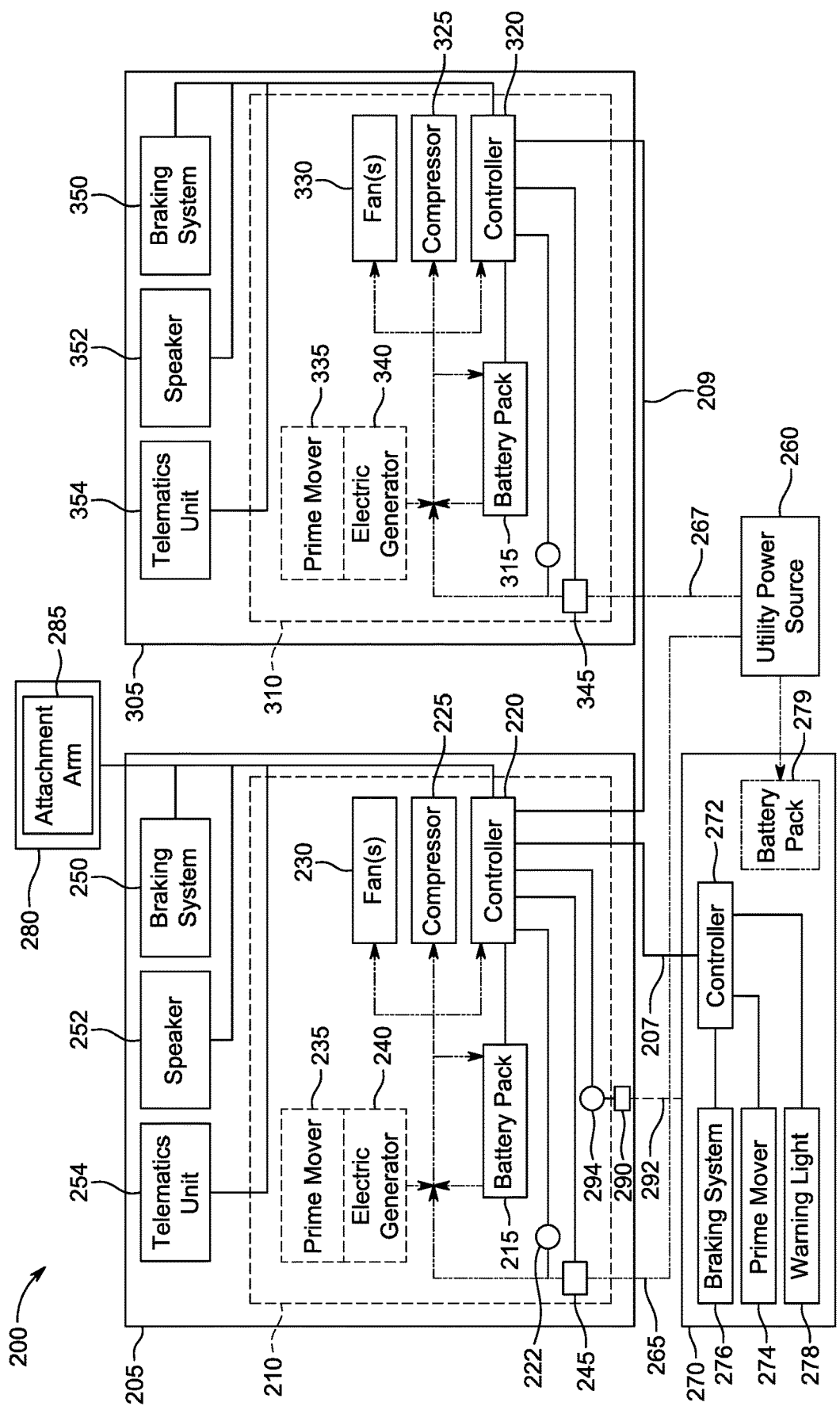
FIG. 3 is a schematic diagram of a drive off protection system, according to an embodiment.

FIG. 3 is a schematic diagram of a drive off protection system 200 and a utility power source 260. The drive off protection system 200 includes a refrigerated transport unit 205 (e.g., the transport refrigeration unit 1 in FIG. 1) and a tow vehicle (e.g., tow vehicle 3 in FIG. 1) attached to the refrigerated transport unit 205. The refrigerated transport unit 205 has an electrical power system 210. The electrical power system 210 includes a battery pack 215, a controller 220, a compressor 225, and fan(s) 230. For example, the compressor 225 may be disposed in a TRU (e.g., the TRU 10 in FIG. 1) and configured to compress a working fluid in a fluid circuit (not shown) of the TRU. It should be appreciated that the electrical power system 210 may include additional or other electrically powered components for a refrigerated transport unit than those shown in FIG. 3.

The electrical power system 210 may optionally include a prime mover 235 and an electric generator 240. For example, the electrical power system 210 may include the prime mover 235 and the electrical generator 240 when the refrigerated transport unit 205 is a hybrid refrigerated transport unit that utilizes both the battery pack 215 and the prime mover 235 for power.

The prime mover 235 can be, for example, a diesel engine or other type of internal combustion engine, a compressed natural gas engine, etc. In an embodiment, the prime mover 235 is a diesel engine disposed in the TRU (e.g., the TRU 50 in FIG. 1). The electric generator 240 is configured to receive mechanical power from the prime mover 235 and produce electrical power. For example, the electric machine 240 can be and/or include an induction machine (e.g., an asynchronous induction machine), a motor, etc.

The electrical power system 210 is configured to provide power to the controller 220, compressor 225, and fan(s) 230. In an embodiment, the electrical power system 210 may also provide power to other electrical components of the TRU. The electrical power system 210 is also configured to provide power to the battery pack 215 when the battery pack 215 requires charging.

When not being transported, the refrigerated transport unit 205 can be parked at a facility (e.g., a building, a warehouse, a charging station, the docking port 130 in FIG. 2) that includes a utility power source 260. For example, the utility power source 260 may be grid power or a generator of the facility (e.g., a generator of the docking port 130 in FIG. 2). The external electric power provided by the utility power source 260 may be in form of DC electric power or AC electric power. In an embodiment, the electrical power system 210 may include a power converter (not shown) to convert the AC electric power provided by the utility power source 280 into DC electric power for use by specific electrical components of the electrical power system (e.g., for charging the battery pack 215, etc.). In another embodiment, the utility power source 260 may be a charging station configured to convert AC utility power to provide DC electric power. The electrical power system 210 is configured to receive external power from a utility power source 260. The electrical power system 210 includes a socket 245, and an external electrical cord 265 for the utility power source 260 is physically connected to the socket 245 to electrically connect the electrical power system 210 and the utility power source 260. In an embodiment, the external electric cord 265 may be automatically connected to the refrigerated transport unit 205 when parked at the facility that includes utility power source 260. For example, the facility of the utility power source 260 may detect if the refrigerated transport unit 205 is parked at the facility and be configured to physically attach the external electric cord 265 to the socket 245.

The controller 220 monitors the electrical power system 210. In particular, the controller 220 is configured to detect whether the electrical power system 210 is electrically connected to the utility power source 260. In an embodiment, the controller 210 detects if power is being supplied to the electrical power system 210 from the utility power source 260. For example, the controller may utilize a sensor 222 to detect if power (e.g., current, voltage, etc.) is being supplied from an external power source to the electrical power system 210. In an embodiment, the controller 220 detects if the electric cord 265 is physically connected to the socket 245 to determine if the electrical power system 210 is electrically connected to the utility power source 260.

The controller is electrically connected to a braking system 250, a speaker 252, and a telematics unit 254 of the refrigerated transport unit 205. The speaker 252 is disposed outside of the transport unit of the refrigerated transport unit 205. The controller 220 can operate the speaker 252 to produce sound (e.g., warnings, information, etc.). The braking system 250 is configured to prevent the wheels (e.g., wheels 40 in FIG. 1) of the transport unit of the refrigerated transport unit 205 from rotating. The telematics unit 254 wirelessly transmits information to a remote server and/or facility. The speaker 252 and telematics unit 254 in FIG. 2 are disposed within the refrigerated transport unit 205. However, the speaker 252 and/or the telematics unit 254 may be disposed in the attached tow vehicle 270 in an embodiment.

The controller 220 is configured to communicate with the tow vehicle 270. More specifically, the controller 220 communicates with a controller 272 of the tow vehicle 270. The controller 272 controls the operation of the tow vehicle including a braking system 276, a prime mover 274, and a warning light of the tow vehicle 270. The braking system 276 and prime mover 274 are similar to the braking system 7 and prime mover 5 as discussed above regarding the tow vehicle 3 in FIG. 1. The warning light 278 is disposed within the tow vehicle 270 and is configured to warn an operator in the tow vehicle 270 that an attached refrigerated transport unit is electrically connected to a utility power source 260. In an embodiment, the warning light 278 may be disposed on the outside of the tow vehicle 3 and configured to warn nearby personal including the operator. As similarly discussed regarding the tow vehicle 3 in FIG. 1, the tow vehicle 270 may optionally include a battery pack 279. When the tow vehicle 270 includes a battery pack 279, the tow vehicle 270 may be configured to charge the battery pack 279 with the utility power source 260 as shown in FIG. 3.

The controller 220 is also configured to communicate with a docking port 280 (e.g., docking port 130 in FIG. 2) that includes an attachment arm 285. When engaged, the attachment arm 285 is configured to physically restrain the refrigerated transport unit 205 from leaving the docking port 280 as similarly discussed regarding the attachment arm 135 in FIG. 2. The controller 220 is configured to communicate with the docking port 280 regarding the engagement of the attachment arm 285. For example, the controller 220 may initiate the docking port 280 to engage and/or disengage the attachment arm 285.

The utility power source 260 in FIG. 3 is separate from the docking port 280. However, in some embodiments, the utility power source 260 may be a part of the docking port 280. In an embodiment, the docking port 280 may be a charging station that includes the attachment arm 285. In such embodiments, the external electrical cord 265 may extend from the docking port 280 to the refrigerated transport unit 205 to provide external electrical power to the electrical power system 210 of the refrigerated transport unit.

The refrigerated transport unit 305 can include components that require pressurized air for operating. For example, the braking system 250 may require pressurized air to operate. The refrigerated transport unit 205 may also include an air system 290 to provide pressurized air to the components that utilize pressurized air (e.g., the braking system, etc.). The air system 290 receives its pressurized air from the tow vehicle 270 through a pressurized air line 292. When the tow vehicle 270 is attached to the refrigerated transport unit 270, the pressurized air line 292 is connected to the air system 290 of the refrigerated transport unit 280, and the air system is pressurized. Thus, the pressure of the air system 290 increases when the tow vehicle is attached to the refrigerated transport unit 270. A pressure sensor 292 is connected to the air system 290. The controller 220 of the refrigerated transport unit 205 is configured to detect the pressure of the air system 290. More specifically, the controller 220 uses the pressure sensor 292 to determine the pressure of the air system 290. The controller 220 can determine that that the tow vehicle 270 is attached to the refrigerated transport unit 205 based on the pressure of the air system 290. For example, the tow vehicle 270 is attached to the refrigerated transport unit 305 when the air system 290 has a pressure that is above a predetermined pressure (e.g., atmospheric pressure, a pressure below the normal pressure of the air system 290 when pressurized, etc.). The drive off protection system 200 in FIG. 3 also includes a second refrigerated transport unit 305 (e.g., refrigerated transport unit 120 in FIG. 2). The refrigerated transport unit 305 is attached to the first refrigerated transport unit 205 similar to the rear refrigerated transport unit 120 and the front refrigerated transport unit 110 in FIG. 2. The second refrigerated transport unit 305 has a similar configuration to the first refrigerated transport unit 205. For example, the second refrigerated transport unit 305 includes an electric power system 310 with a battery pack 315, a controller 320, a compressor 325, fan(s) 330, and optionally a prime mover 335 and an electric generator 340. The controller 320 is also connected to a respective telematics unit 354, speaker 352, and braking system 350 of the refrigerated transport unit 305.

The electric power system 310 is configured to receive power from a utility power source 260. The electrical power system 310 includes a socket 345 and an external electrical cord 267 for the utility power source 260 is physically connected to the socket 345.

In a similar manner to the controller 220 and the electrical power system 210, the controller 320 is configured to detect whether the electrical power system 310 of the second refrigerated transport unit 305 is electrically connected to the utility power source 260. The controller 320 is also configured to communicate with the controller 220. In particular, the controller 320 is configured to communicate to the controller 220 when the electrical power system 310 of the second refrigerated transport unit 305 is electrically connected to the utility power source 260.

The communication line 207 from the refrigerated transport unit 205 to the tow vehicle 270 and the communication line 209 between the refrigerated transport units 205, 305 are power communication lines. For example, the communications are transmitted by the communication lines 207, 209 in a similar manner to antilock braking system ("ABS") communications between modules of the ABS. However, the communication lines 207, 209 may be different from power line communications in an embodiment. In an embodiment, the communications lines 207, 209 may utilize other types of non-powered communication lines used for communication between a tow vehicle 270 and a transport refrigeration unit 205, 305. Non-powered communication lines may include, but are not limited to, Controller Area Network (CAN) communication lines and Local Internet Network (LIN) communication lines. In an embodiment, the communication lines 207, 209 may be wireless communications.

The drive off protection system 200 in FIG. 3 includes two refrigerated transport unit 205, 305. However, it should be appreciated that the drive off protection system 300 in an embodiment may have a different number of refrigerated transport units 205, 305 than two. In an embodiment, the drive off protection system 200 may include one or more refrigerated transport units 205, 305. In an embodiment, the drive off protection system 200 may include a single refrigerated transport unit 205. In another embodiment, the drive off protection system 200 may include three of refrigerated transport units 205, 305. For example, a third refrigerated transport unit may be attached to the second refrigerated transport unit 305 and the controller of the third refrigerated transport unit may be configured to communicate with the controller 320 of the second refrigerated transport unit 305.

Figure 4:
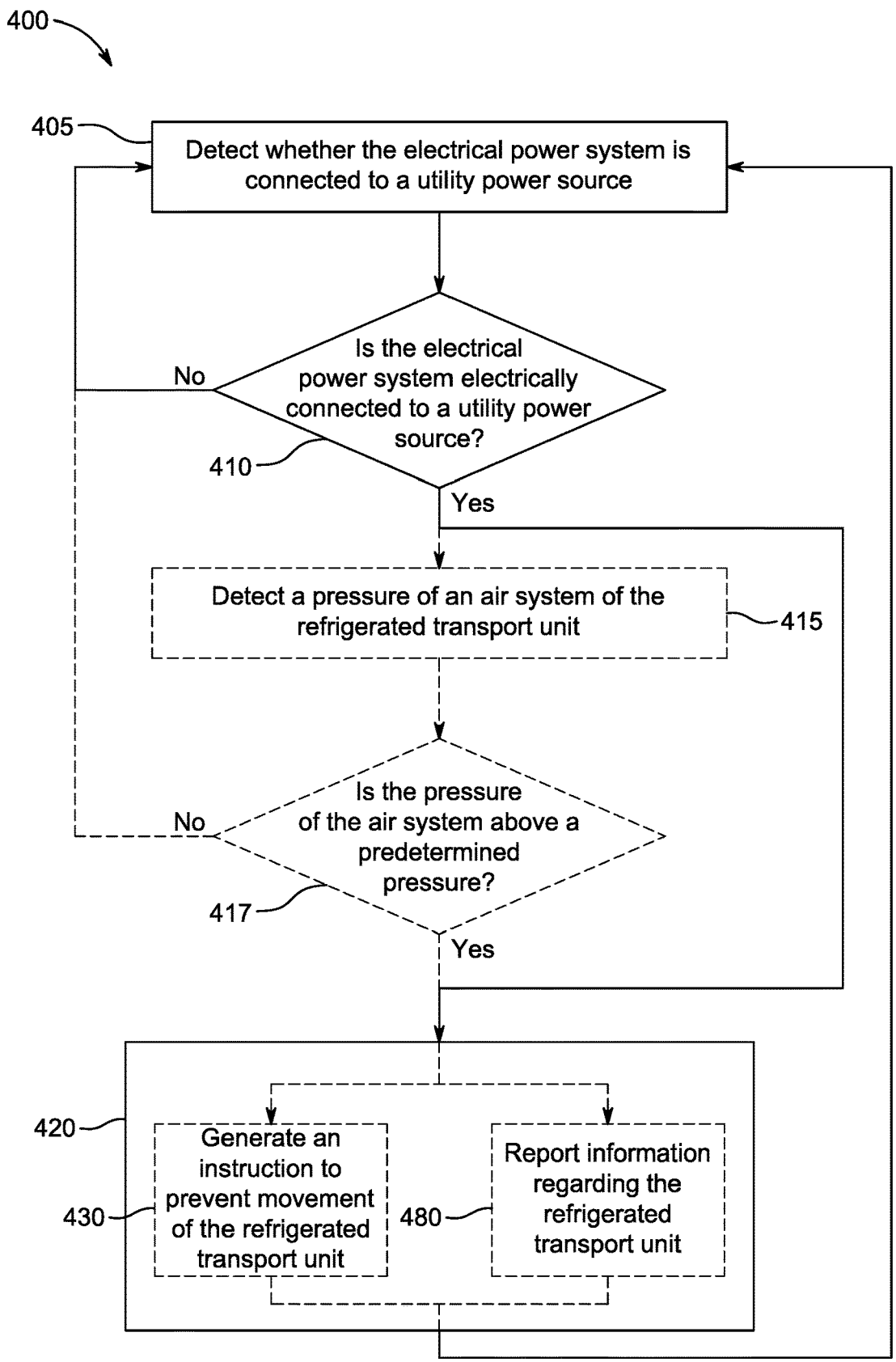
FIG. 4 is a flowchart of a method for preventing drive off of a refrigerated transport unit, according to a first embodiment.

FIG. 4 is a flowchart of a method 400 for preventing drive off of a refrigerated transport unit (e.g., refrigerated transport unit 1, refrigerated transport unit 110), according to a first embodiment. In an embodiment, the method 400 may be employed by the drive off protection system 200 in FIG. 3. The method starts at 405.

At 405, a controller (e.g., controller 55, controller 220) detects whether an electrical power system (e.g. electrical power system 210) is electrically connected to a utility power source (e.g., utility power source 260). The electrical connection in an embodiment can be a physical connection (e.g., a connection using an external electrical cord). The electrical connection in other embodiments can be a wireless connection between the refrigerated transport unit and the utility power source. In an embodiment, the controller determines whether an electrical power system is electrically connected to a utility source based on external power being provided to the electrical power system. In such an embodiment, this may include sensing whether a current is being supplied from a socket (e.g., socket 245, socket 345) of the electrical power system that is used to provide power from a utility power source (e.g., utility power source 260) to the electrical power system. For example, a sensor (e.g., sensor 222) may be used to sense whether a current is being supplied from the socket. In another embodiment, 405 may include sensing a physical connection between the socket and an external electrical cord (e.g., external electrical cord 265) for the utility power source. The method 400 then proceeds to 410.

At 410, if the electrical power system is not electrically connected to a utility power source, the method 400 proceeds back to 405. If the electrical power system is electrically connected to the utility power source, the method 400 then optionally proceeds to 415 or proceeds straight to 420.

At optional 415, the pressure of the air system (e.g., air system 290) of the refrigerated transport unit is detected. For example, the controller may utilize a pressure sensor (e.g., pressure sensor 294) to detect the pressure of the air system. The method 400 then proceeds to 417.

At optional 417, if the pressure of the air system is above a predetermined pressure, the method proceeds to 420. As discussed above, the air system is pressurized when a tow vehicle is attached to the refrigerated transport unit. In an embodiment, the predetermined pressure is a pressure that indicates that the air system is connected to the tow vehicle. For example, the predetermined pressure may be atmospheric pressure, a pressure below the normal pressure of the air system 290 when pressurized, etc. If the pressure of the air system is at or below the predetermined pressure, the method 400 proceeds back to 405.

At 420, the controller acts based on the refrigerated transport unit being electrically connected to the utility power source. For example, the action by the controller may include, but is not limited to, generating an instruction to prevent movement of the refrigerated transport unit 430 and/or reporting information regarding the transport unit 480 as shown in FIG. 4. However, each of 430 and 480 is an example of an action based on the refrigerated transport unit being electrically connected to the utility power source 420. Accordingly, performing an action based on the refrigerated transport unit being electrically connected to the utility power source 420 in FIG. 4 may not include one or both of 430 or 480 in an embodiment. In another embodiment, the method 400 may include one of 430 and 480. In FIGS. 4, 430 and 480 are shown as occurring concurrently. However, it should be understood that in some embodiments 430 and 480 may occur sequentially with 430 proceeding before 480 or after 480.

At 430, the controller generates an instruction to prevent movement of the refrigerated transport unit. The instruction is configured to prevent movement of the refrigerated transport unit while the electrical power system of the refrigerated transport unit is electrically connected to the utility power source. In an embodiment, the instruction may be configured to make the refrigerated transport unit more difficult to move, affect the operation of a tow vehicle attached to the refrigerated transport unit (e.g., tow vehicle 3, tow vehicle 270), and/or provide a warning to nearby personal. For example, the instruction may make the refrigerated transport unit more difficult to move by activating the braking system of the refrigerated transport unit (e.g., the braking system 42, braking system 250).

At 480, the controller reports information regarding the refrigerated transport unit. In an embodiment, a report of the information is stored in the controller (e.g., in a memory of the controller) of the refrigerated transport unit. In another embodiment, the information is reported external to the refrigerated transport unit using a telematics unit (e.g., telematics unit 254). The telematics unit may be a telematics unit disposed in the refrigerated transport unit, a second refrigerated transport unit attached to the refrigerated transport unit (e.g., refrigerated transport unit 120, the refrigerated transport unit 305), or a tow vehicle (e.g., tow vehicle 3, tow vehicle 270) attached to the refrigerated transport unit.

In an embodiment, 480 may include reporting movement of the refrigerated transport unit that occurred while the electrical power system was connected to the utility power source can be reported, As discussed above, towing away the refrigerated transport unit while it is physically connected to the utility power source can cause damage to the refrigerated transport unit or the utility power source. For example, the movement of the refrigerated transport unit while connected to the utility power source may be used to determine when damage which resulted from moving refrigerated transport unit while still physically connected to the utility power source occurred.

In an embodiment, 480 may include, reporting external to the refrigerated transport unit that the refrigerated transport unit is electrically connected to the utility power source and that a tow vehicle is attached to the refrigerated transport unit. In an embodiment, this may be reported to the facility at which the refrigerated transport unit is parked (e.g., a yard, an overnight stopping location, etc.). For example, the yard facility may include an operator, server, and/or computer configured to monitor operations within the yard. The operator, server, and/or computer may remotely disable the attached tow vehicle to prevent movement of the refrigerated transport unit when the refrigerated transport unit physically electrically connected to the utility power source, and/or when a battery pack (e.g., battery pack 215) is still being charged or needs to be charged (e.g., is below a predetermined amount). The method 400 then proceeds back to 405.

Figure 5:
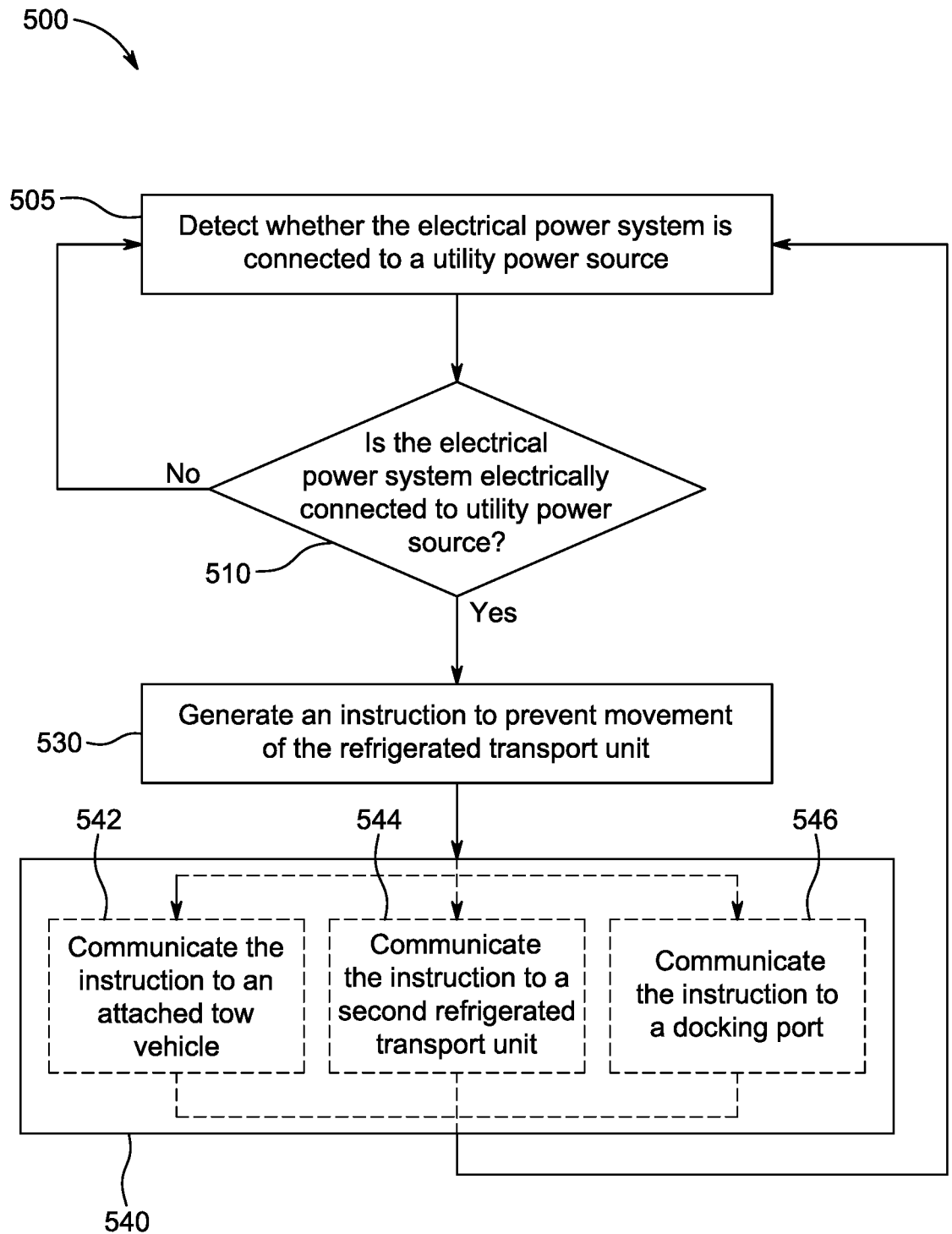
FIG. 5 is a flowchart of a method for preventing drive off of a refrigerated transport unit, according to a second embodiment.

FIG. 5 is a flowchart of a method 500 for preventing drive off of a refrigerated transport unit (e.g., refrigerated transport unit 1, refrigerated transport unit 110), according to a second embodiment. In an embodiment, the method 500 may be employed by the drive off protection system 200 in FIG. 3. The method starts at 505.

At 505, a controller (e.g., controller 55, controller 220) detects whether an electrical power system (e.g. electrical power system 210) is electrically connected to a utility power source (e.g., utility power source 260). In an embodiment, 505 can be similar to 405 in FIG. 4. The method 500 then proceeds to 510.

At 510, if the electrical power system is not electrically connected to a utility power source, the method 500 proceeds to back to 505. If electrical power system is electrically connected to the utility power source, the method 500 proceeds to 530.

At 530, the controller generates an instruction to prevent movement of the refrigerated transport unit. The instruction is configured to prevent movement of the refrigerated transport unit while the refrigerated transport unit is electrically connected to the utility power source. In an embodiment, 530 is similar to 430 in FIG. 4. The method 500 then proceeds to 540.

At 540, the instruction is communicated external to the refrigerated transport unit. This can include 542, 544, 546. In an embodiment, the controller of the refrigerated transport unit is configured to communicate the instructions external to the refrigerated transport unit. Each of 542, 544, and 546 are examples of communicating the instruction external to the refrigerated transport unit. 542, 544, and 546 are shown as occurring concurrently. However, it should be appreciated that in other embodiments one or more of the communications 542, 544, 546 may occur sequentially.

At 542, the instructions are communicated to a tow vehicle (e.g., tow vehicle 3, tow vehicle 270) attached to the refrigerated transport unit. For example, the instruction may be communicated to a controller of the tow vehicle (e.g., controller 6, controller 272). The communications from the refrigerated transport unit to the tow vehicle may be transmitted via a power communication line (e.g., power communication line 207). For example, the communications may be transmitted in a similar manner as ABS communications. In an embodiment, the communications may be transmitted via non-powered types of communication lines that are used for communicating between a refrigerated transport unit and a tow vehicle (e.g., CAN communication lines, LIN communication lines, etc.). In another embodiment, the instruction may be communicated to the tow vehicle wirelessly.

The instruction is configured to prevent movement of the tow vehicle while the electrical power system of the refrigerated transport unit is electrically connected to the utility power source and the tow vehicle is attached to the refrigerated transport unit. In an embodiment, the instructions may be configured to prevent movement of the tow vehicle by activating a braking system (e.g., braking system 7, braking system 276) of the tow vehicle. For example, the instructions may initiate the controller of the tow vehicle to active the braking system of the tow vehicle. In an embodiment, the instruction may be configured to prevent a prime mover (e.g., prime mover 6, prime mover 274) from providing movement to the tow vehicle while the electrical power system of the refrigerated transport unit is electrically connected to the utility power source and the tow vehicle is attached to the refrigerated transport unit. For example, the instructions may initiate the controller of the tow vehicle to disable a transmission of the prime mover or shutdown the prime mover of the tow vehicle while the electrical power system of the refrigerated transport unit is electrically connected to the utility power source and the tow vehicle is attached to the refrigerated transport unit. For example, the instructions may be configured to disconnect an ignition circuit of the prime mover. In an embodiment, the instructions may use a relay in the tow vehicle to disable the ignition circuit. In an embodiment, the prime mover may include a remote controller configured to disable the ignition, and the instruction may be communicated to the remote controller and initiate the remote controller to disable to the ignition.

At 544, the instruction is communicated to a second refrigerated transport unit (e.g., refrigerated transport unit 120, refrigerated transport unit 305). The instruction may be configured to prevent the second refrigerated transport unit from moving while the electrical power system of the first refrigerated transport unit is electrically connected to the utility power source. As discussed above regarding FIG. 3, the communications from a first refrigerated transport unit to a second refrigerated transport unit may be transmitted as power line communications. For example, the communications may be transmitted in a similar manner as ABS communications. In another embodiment, the instruction may be communicated wirelessly from the first refrigerated transport unit to the second refrigerated transport unit. In an embodiment, the second refrigerated transport unit may be attached to a tow vehicle instead of the first refrigerated transport unit. In such an embodiment, the first refrigerated transport unit may communicate the instructions to the second refrigerated transport unit, and then the second refrigerated transport unit may communicate the instructions to the tow vehicle to prevent the tow vehicle from moving as discussed above regarding 542.

At 546, the instruction is communicated to a docking port (e.g., docking port 130, docking port 280). The docking port includes an attachment arm (e.g., attachment arm 135, attachment arm 285) that is configured to physically restrain the refrigerated transport unit. In an embodiment, the attachment arm is configured to attach the docking port and the transport unit of the refrigerated transport unit (e.g., transport unit 122). In another embodiment, the attachment arm is attached to the ground near the docking port and is configured to physically restrain the transport unit from leaving the docking port. When engaged, the attachment arm is attached to refrigerated transport unit and is configured to prevent the refrigerated transport unit from leaving the docking port. The instruction is configured to prevent the attachment arm from being disengaged while the electrical power system of the refrigerated transport unit is electrically connected to the utility power source. For example, the instruction informs the docking port to keep the attachment arm engaged while the electrical power system of the refrigerated transport unit is electrically connected to the utility power source. After 542, 544, and 546, the method 500 returns back to 505.

The method 500 in FIG. 5 includes communicating the instruction to an attached tow vehicle 542, communicating the instruction to a second refrigerated transport unit 544, and communicating the instruction to a docking port 546. However, each of 542, 544, and 546 is an example of communication the instruction external to the refrigerated transport unit 540. Accordingly, communicating the instruction outside of the refrigerated transport unit 530 in FIG. 5 may not include any of 542, 544, or 546 in an embodiment. In another embodiment, the method 500 may include one or more of 542, 544, and 546. In an embodiment, the method 500 may include one, two, or three of 542, 544, and 546.

Figure 6:
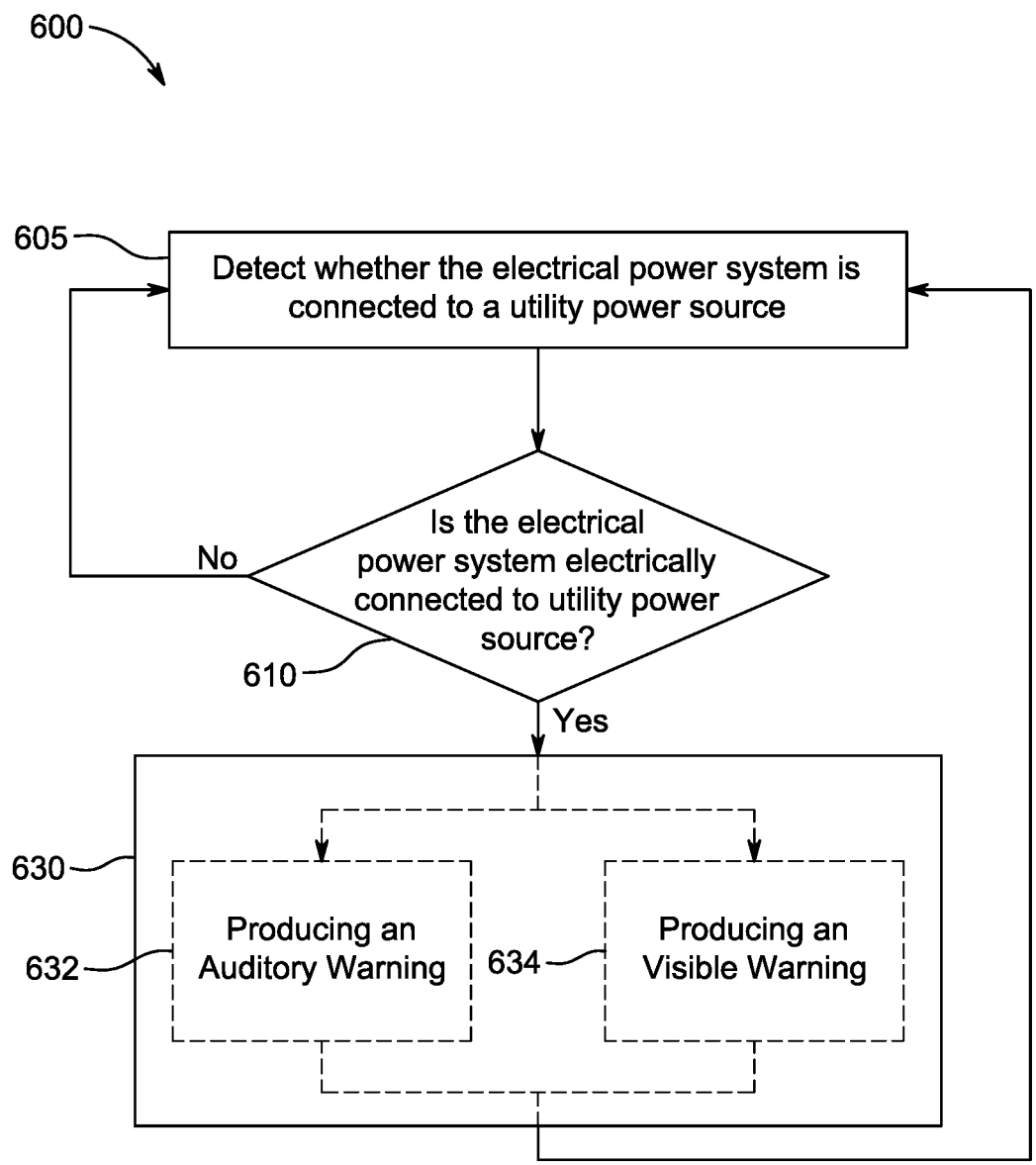
FIG. 6 is a flowchart of a method for preventing drive off of a refrigerated transport unit, according to a third embodiment.

FIG. 6 is a block diagram of a method 600 for preventing drive off of a refrigerated transport unit (e.g., refrigerated transport unit 1, refrigerated transport unit 110), according to a third embodiment. In an embodiment, the method 600 may be employed by the drive off protection system 200 in FIG. 3. The method starts at 605.

At 605, a controller (e.g., controller 55, controller 220) detects whether an electrical power system (e.g. electrical power system 210) is electrically connected to a utility power source (e.g., utility power source 260). In an embodiment, 605 is similar to 405 as discussed above. The method 605 then proceeds to 610.

At 610, if the electrical power system is not electrically connected to a utility power source then the method 600 proceeds back to 605. If the electrical power system is electrically connected to the utility power source, the method 600 proceeds to 630.

At 630, the controller generates an instruction to prevent movement of the refrigerated transport unit. The instruction can be configured to provide a warning to personal near the refrigerated transport unit. 630 can include producing an auditory warning 632 and producing a visible warning 634. Each of 632 and 634 is an example of the instruction configured to provide a warning to personal near the refrigerated transport unit.

At 632, the instruction is configured to operate a speaker (e.g., speaker 252, speaker 352) to produce an auditory warning. The speaker may be disposed in the refrigerated transport unit or an attached tow vehicle (e.g., tow vehicle 3, tow vehicle 270). For example, the instructions may initiate the controller of the refrigerated transport unit or a controller of an attached tow vehicle (e.g., controller 6, controller 272) to operate a speaker to produce the auditory warning. In an embodiment, the auditory warning can be produced 632 when a tow vehicle is attached to the refrigerated transport unit. In another embodiment, the auditory warning is produced 632 when an attached tow vehicle attempts to move the refrigerated transport unit while the electrical power system is electrically connected to the utility power source.

At 634, the instruction is configured to operate a warning light (e.g., warning light 278) to produce a visible warning. The warning light is disposed on the refrigerated transport unit or on/in an attached tow vehicle. For example, the warning light may be disposed in an attached tow vehicle (e.g., in a dash of the attached tow vehicle), on the outside of the tow vehicle, or on the outside of the refrigerated transport unit. The warning light is configured to inform personal near the refrigerated transport unit (e.g., an operator of the attached refrigerated transport unit, a person located near the refrigerated transport unit, etc.) that the refrigerated transport unit is electrically connected to the utility power source. In an embodiment, the visible warning is produced 634 when an attached tow vehicle attempts to move the refrigerated transport unit while the electrical power system is electrically connected to the utility power source.

The warning light for 632 and/or the speaker for 634 in an embodiment may be external to the refrigerated transport unit as discussed above. In an embodiment, the method 600 includes communicating the instruction from the refrigerated transport unit. For example, the method 600 may include communicating the instruction to an attached tow vehicle similar to 542 in FIG. 5. For example, the method 600 may include communicating the instruction to the facility (e.g., a building, a warehouse, a charging station including the utility power source, the docking port 130 in FIG. 2) at which the refrigerated transport unit is parked. The facility includes the warning light for 632 and/or the speaker for 634.

After 632 and 634, the method 600 proceeds back to 605. The method 600 in FIG. 6 includes both producing an auditory warning 632 and producing a visible warning 634. However, each of 632 and 634 are examples of a warning for personal near the refrigerated transport unit 630. Accordingly, the instruction at 630 in an embodiment may not be configured to either produce an auditory warning 632 or produce a visible warning 634. In an embodiment, method 600 in an embodiment may include one or more of 632 or 634. In an embodiment, the method 600 may include only one of 632 or 634.

Figure 7:
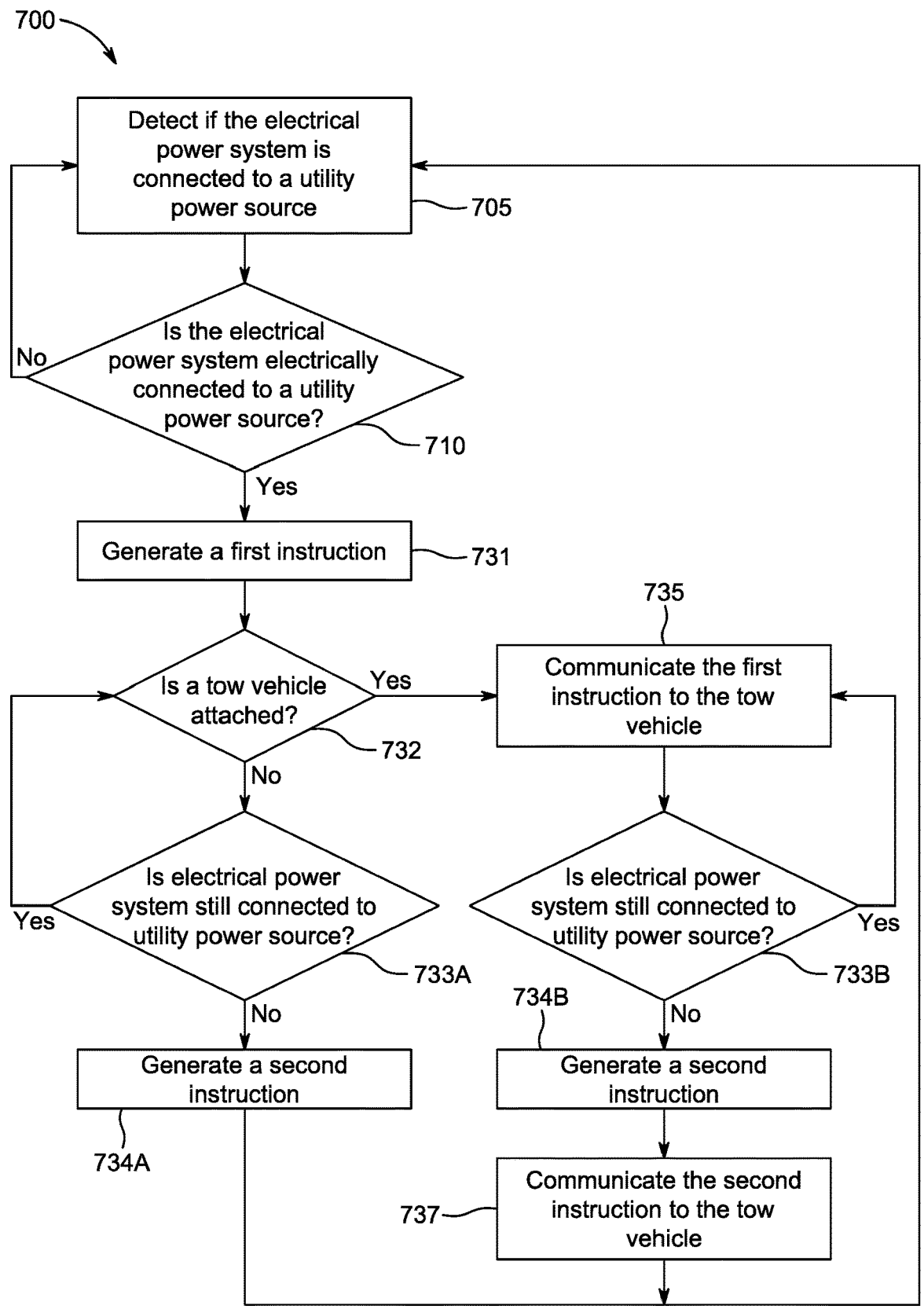
FIG. 7 is a flowchart of a method for preventing drive off of a refrigerated transport unit, according to a fourth embodiment.

FIG. 7 is a block diagram of a method 700 for preventing drive off of a refrigerated transport unit (e.g., refrigerated transport unit 1, refrigerated transport unit 205), according to a fifth embodiment. In an embodiment, the method 700 of preventing drive off of a refrigerated transport unit may be employed by the drive off protection system 200 in FIG. 3. The method starts at 705.

At 705, a controller (e.g., controller 55, controller 220) detects whether an electrical power system (e.g. electrical power system 210) is electrically connected to a utility power source (e.g., utility power source 260). In an embodiment, 705 is similar to 405 as discussed above. The method 700 then proceeds to 710.

At 710, if the electrical power system is not electrically connected to the utility power source then the method 700 proceeds back to 705. If the electrical power system is electrically connected to the utility power source, the method 700 proceeds to 731.

At 731, the controller generates a first instruction to prevent movement of the refrigerated transport unit. For example, the first instruction may be configured to make the refrigerated transport unit more difficult to move, affect operation of an attached tow vehicle (e.g., tow vehicle 3, tow vehicle 270), and/or provide a warning to personal near the refrigerated transport unit or the attached tow vehicle. The method 700 then proceeds to 732.

At 732, if no tow vehicle is attached to the refrigerated transport unit then the method proceeds to 733A. If a tow vehicle is attached to the refrigerated transport unit, the method proceeds to 735. For example, a controller of the refrigerated transport unit may determine that a tow vehicle is attached based on one or more of its electrical connections (e.g., communication line 207) being connected to the tow vehicle and/or the movement of the refrigerated transport unit.

At 733A, it is detected whether the electrical power system is still electrically connected to the utility power source. For example, this electrical connection is determined 733A in a similar manner as 705. If the electrical power system is still electrically connected to the utility power source, the method 700 proceeds back to 732. If the electrical power system is no longer electrically connected to the utility power source, the method proceeds to 734A.

At 734A, a second instruction is generated to indicate that movement of the refrigerated transport unit is allowed. The second instruction undoes any changes caused by the first instruction. In some instances, the second instruction may not actively cause any of the changes (e.g., deactivating the braking system of the refrigerated transport unit, etc.). For example, the refrigerated transport unit may still be parked and the braking system of the refrigerated transport unit (e.g., braking system 42, braking system 250) may be kept active to prevent the refrigerated transport unit from rolling until a tow vehicle is attached to the refrigerated transport unit. The method 700 then proceeds back to 705.

At 735, the first instruction is communicated to the attached tow vehicle. The first instruction is configured to prevent movement of the tow vehicle as similarly discussed above regarding 542. The first instruction may be communicated to the tow vehicle in a similar manner as discussed above regarding 542.

At 733B, it is detected whether the electrical power system is still electrically connected to the utility power source similar to 733A. If the electrical power system is still electrically connected to the utility power source, the method 700 proceeds back to 735. If the electrical power system is not electrically connected to the utility power source, the method proceeds to 734B.

At 734B, the controller generates a second instruction to indicate that movement of the refrigerated transport unit is allowed similar to 734A. The method then proceeds to 737.

At 737, the second instruction is communicated to the tow vehicle. In an embodiment, the second instruction is configured to undo any changes caused to the tow vehicle by the first instruction. The second instruction may not actively cause any changes in the tow vehicle, but is configured to allow the tow vehicle (e.g., informs the controller of the tow vehicle) to move when desired.

In an embodiment, the first instruction and the second instruction are communicated from the refrigerated transport unit to the tow vehicle as an electrical signal (e.g., a wired electronic signal, a wireless electronic signal). For example the first instruction is an electrical signal that initiates the controller of the tow vehicle to configure the tow vehicle to prevent its movement. In another embodiment, the first instruction communicated to the tow vehicle at 735 is an active signal (e.g., a wired electronic signal, a wireless electronic signal) that is communicated to the tow vehicle continuously or in a set pattern (e.g., every 15 seconds, every 30 seconds, etc.). In such an embodiment, communicating the second instruction to the tow vehicle 272 may be stopping the transmission of the active signal to the tow vehicle. The method then proceeds back to 705.

Generating the first instruction 731 and generating the second instruction 734A/734B in FIG. 7 are an example for an embodiment for generating an instruction to prevent movement of the refrigerated transport unit while the electric power system is electrically connected to the utility power source. In an embodiment, 430 in method 400, 530 in method 500, and/or 630 in method 600 may include generating a first instruction 731 and generating a second instruction 734A/734B similar to method 700. In such an embodiment, the first instruction 731 and the second instruction 734A may each be a signal or the first instruction 731 may be an active signal and the second instruction 734A may be the lack of the active signal as discussed above.

Figure 8:
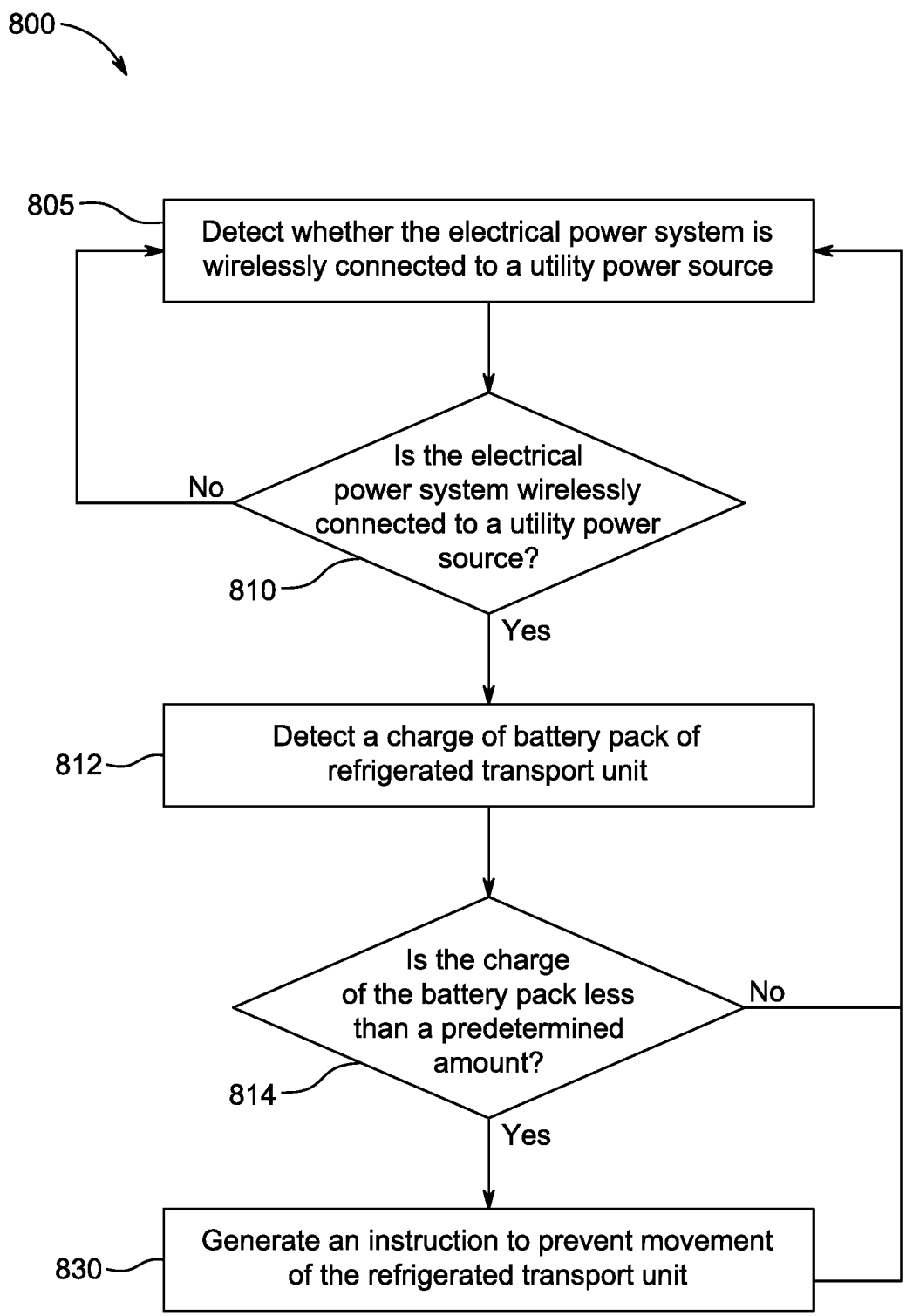
FIG. 8 is a flowchart of a method for preventing drive off of a refrigerated transport unit, according to a fifth embodiment.

FIG. 8 is a flowchart of a method 800 for preventing drive off of a refrigerated transport unit (e.g., refrigerated transport unit 1, refrigerated transport unit 205), according to a sixth embodiment. In an embodiment, the method 800 of preventing drive off of a refrigerated transport unit may be employed by the drive off protection system 200 in FIG. 3, except that the electrical power system (e.g., electrical power system 210) of the refrigerated transport unit is able to wirelessly receive power from a utility power source (e.g., utility power source 260) instead of via an external electrical cord (e.g., external electrical cord 265). For example, the wireless charging may be, be is not limited to, induction charging.

At 805, a controller (e.g., controller 55, controller 220) detects whether the electrical power system is wirelessly connected to a utility power source. For example, the electrical power system can be wirelessly connected to the utility power source when the electrical power system is able to wirelessly receive power from the utility power source. In an embodiment, the electrical power system may be configured to not wirelessly connect with the utility power source until the refrigerated transport unit has been parked. The method 800 then proceeds to 810.

At 810, if the electrical power system is not connected to a utility power source, the method proceeds back to 805. If the electrical power system is wirelessly connected to the utility power source, the method 800 proceeds to 812.

At 812, the controller detects a charge of a battery pack (e.g., battery pack 35, battery pack 215) of the refrigerated transport unit. For example, the controller may utilize one or more sensors (e.g., voltage sensor, current sensor, etc.) to determine the charge of the battery pack. The method 800 then proceeds to 814.

At 814, if the charge of the battery pack is less than a predetermined amount then the method proceeds to 830. For example, a predetermined amount may be based on a desired minimum charge for the battery pack before its charging is ended, and/or a minimum amount of charge needed for the next trip of the refrigerated transport unit. In an embodiment, the controller of the refrigerated transport unit and/or attached tow vehicle may determine the predetermined amount. In another embodiment, the predetermined amount may be provided to the refrigerated transport unit by an operator or a remote server or facility via a telematics unit (e.g., telematics unit 254). In an embodiment, at 814, the electrical power system is configured to charge the battery pack using the utility power source when the battery pack is below the predetermined amount. Accordingly, the battery pack in such an embodiment is being charged when it is below the predetermined amount. If the charge of the battery pack is equal to or greater than the predetermined amount, the method 800 proceeds back to 805. For example, the method 800 proceeds back to 805 as the battery pack does not require additional charging for its next trip, and the refrigerated transport unit does not need to be preventing from moving as the battery pack is sufficiently charged.

At 830, an instruction to prevent movement of the refrigerated transport unit is generated. The instruction is configured to prevent movement of the refrigerated transport unit while the refrigerated transport unit is electrically connected to the utility power and the battery pack has a charge below the predetermined amount. For example, the instruction may include making the refrigerated transport unit more difficult to move, affecting operation of an attached tow vehicle (e.g., tow vehicle 3, tow vehicle 270), and/or providing a warning an operator as similarly discussed above regarding the method 400 in FIG. 4, the method 500 in FIG. 5, the method 600 in FIG. 6, and the method 700 in FIG. 7. In an embodiment, the instruction at 830 may include a single signal (e.g., an active signal) or multiple signals as similarly discussed above regarding the method 700. The method 800 then proceeds back to 805.

It should be understood the methods 400, 500, 600, 700, 800 in FIGS. 4-8 may combined. In an embodiment, a method for preventing drive off of a refrigerated transport unit may include features of one or more of the methods 400, 500, 600, 700, 800. For example, the method 800 in an embodiment may include reporting information regarding the refrigerated transport unit 480 in addition to or in alternative to generating an instruction to prevent movement of the refrigerated transport unit 830.

Aspects:

Any of aspects 1-12 can be combined with any of aspects 13-18.

Aspect 1. A method for preventing drive off of a refrigerated transport unit, the refrigerated transport unit including a transport unit having an internal space for storing cargo and a transport climate control system to control an environmental condition of the internal space, the method comprising:

detecting whether an electrical power system of the refrigerated transport unit is electrically connected to a utility power source, the electrical power system configured to provide power to the transport climate control system; and performing an action when the electrical power system is electrically connected to the utility power source.

Aspect 2. The method of aspect 1, wherein performing an action when the electrical power system is electrically connected to the utility power source includes:

activating a breaking system of the transport unit while the electrical power system is electrically connected to the utility power source, the activated breaking system configured to prevent rotation of the wheels of the transport unit.

Aspect 3. The method of either one of aspects 1 and 2, wherein performing an action when the electrical power system is electrically connected to the utility power source includes:

generating, when the electrical power system is electrically connected to the utility power source, an instruction to prevent movement of the refrigerated transport unit while the electrical power system is electrically connected to the utility power source; and communicating the instruction to a tow vehicle when the tow vehicle is attached to the refrigerated transport unit, the instruction configured to prevent the movement of the tow vehicle while the electrical power system of the refrigerated transport unit is electrically connected to the utility power source.

Aspect 4. The method of aspect 3, wherein the tow vehicle includes wheels and a braking system to prevent rotation of the wheels, and the method further including:

activating, based on the instruction to prevent movement of the refrigerated transport unit, the braking system to prevent movement of the tow vehicle while the electrical power system of the refrigerated transport unit is electrically connected to the utility power source.

Aspect 5. The method of either one of aspects 3 and 4, wherein the tow vehicle includes a prime mover for moving the tow vehicle along the ground, and the method further including:

preventing, based on the instruction to prevent movement of the refrigerated transport unit, the prime mover from providing movement to the tow vehicle while the electrical power system of the refrigerated transport unit is electrically connected to the utility power source.

Aspect 6. The method of any one of aspects 2-5, further comprising:

communicating the instruction to a docking port including an attachment arm for physically restraining the transport unit; and preventing, based on the instruction to prevent movement of the refrigerated transport unit, the attachment arm from being disengaged from the transport unit while the electrical power system is electrically connected to the utility power source.

Aspect 7. The method of any one of aspects 2-6, further comprising:

determining a charge of a battery pack of the transport refrigeration unit, the battery pack configured to supply electrical power to the transport climate control system for controlling the environmental condition of the interior space; and generating the instruction when a charge of the battery pack is below a predetermined amount and the electrical power system is electrically connected to the utility power source.

Aspect 8. The method of any one of aspects 1-7, further comprising:

communicating the instruction from the first transport refrigeration unit to a second transport refrigeration unit; and preventing movement of the first transport refrigeration unit and the second transport refrigeration unit with the instruction to prevent movement of the first transport refrigeration unit.

Aspect 9. The method of any one of aspects 1-8, wherein generating the instruction to prevent movement of the transport refrigeration unit while the electrical power system is electrically connected to the utility power source includes:

generating a first instruction to prevent movement of the transport refrigeration unit when the electrical power system is electrically connected to the utility power source, and generating a second instruction to stop preventing movement of the transport refrigeration unit when the electrical power system is no longer electrically connected to the utility power source.

Aspect 10. The method of any one of aspects 1-9, wherein performing an action when the electrical power system is electrically connected to the utility power source includes:

producing, a visual warning when the refrigerated transport unit is moved while the electrical power system is electrically connected to the utility power source.

Aspect 11. The method of aspect 10, wherein performing an action when the electrical power system is electrically connected to the utility power source includes:

the visual warning is produced by a warning light disposed within a tow vehicle attached to the refrigerated transport unit.

Aspect 12. The method of any one of aspects 1-11 wherein performing an action when the electrical power system is electrically connected to the utility power source includes:

producing an audible warning via a speaker when a tow vehicle attempts to move the transport refrigeration unit while the electrical power system is electrically connected to the utility power source.

Aspect 13. The method of any one of aspects 1-12, wherein performing an action when the electrical power system is electrically connected to the utility power source includes:

reporting, via a telematics unit, movement of the refrigerated transport unit that occurred while the electrical power system was electrically connected to the utility power source.

Aspect 14. A drive off protection system comprising:
a refrigerated transport unit including:
a transport unit including an internal space for storing cargo,
a transport climate control system configured to control an environmental condition of the internal space,
an electric power system configured to receive external electrical power from a utility power source and provide electrical power to the transport climate control system, and
a controller monitoring the electrical power system, the controller configured to perform an action based on the electrical power system being electrically connected to the refrigerated transport unit.

Aspect 15. The drive off protection system of aspect 14, wherein the electrical power system includes a socket for receiving the external electrical power from the utility power source, and the controller detects a current supplied from the socket to determine whether the electrical power system is electrically connected to the utility power source.

Aspect 16. The drive off protection system of aspect 14, wherein the electrical power system includes a socket for receiving the external electrical power from the utility power source, and the controller is configured to sense a physical connection between an external power cord and the socket to determine whether the electrical power system is electrically connected to the utility power source.

Aspect 17. The drive off protection system of any one of aspects 14-16, wherein the controller is configured to generate an instruction when the electrical power system is electrically connected to the utility power source, and the instruction configured to prevent movement of the refrigerated transport system while the electrical power system is electrically connected to the utility power source.

Aspect 18. The drive off protection system of aspect 17, further comprising:

a tow vehicle attached to the refrigerated transport unit, the tow vehicle including a controller for controlling the tow vehicle, wherein the controller of the refrigerated transport unit is configured to communicate the instruction to the tow vehicle, and the instruction initiates the controller of the tow vehicle to prevent movement of the tow vehicle while the electrical power system of the refrigerated transport unit is electrically connected to the utility power source and the tow vehicle is attached to the refrigerated transport unit.

Aspect 19. The drive off protection system of aspect 18, wherein the tow vehicle includes a prime mover for moving the tow vehicle, and the instruction initiates the controller of the tow vehicle to prevent the prime mover from providing movement to the tow vehicle while the electrical power system of the refrigerated transport unit is electrically connected to the utility power source and the tow vehicle is attached to the refrigerated transport unit.

Aspect 20. The drive off protection system of any one aspects 14-19, further comprising:

a second refrigerated transport unit attached to the first refrigerated transport unit, the second refrigerated transport unit including:

a second transport unit including an internal space for storing cargo, a second transport climate control system configured to control an environmental condition of the internal space of the second transport unit, a second electric power system configured to receive external electrical power from the utility power source and provide electrical power to the second transport climate control system, and a second controller monitoring the second electrical power system, the second controller generates an instruction to prevent movement of the second refrigerated transport unit when the second electrical power system is electrically connected to the utility power source, wherein the second controller is configured to communicate the instruction generated by the second controller to the first controller of the first transport refrigeration unit.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A method for preventing drive off of a refrigerated transport unit, the refrigerated transport unit including a transport unit having an internal space for storing cargo and a transport climate control system to control an environmental condition of the internal space, the method comprising:

detecting whether an electrical power system of the refrigerated transport unit is electrically connected to a utility power source, the electrical power system configured to provide power to the transport climate control system; and performing an action when the electrical power system is electrically connected to the utility power source, which includes:

generating, when the electrical power system is electrically connected to the utility power source, an instruction to prevent movement of the refrigerated transport unit while the electrical power system is electrically connected to the utility power source.

2. The method of claim 1, wherein performing an action when the electrical power system is electrically connected to the utility power source includes:

activating a breaking system of the transport unit while the electrical power system is electrically connected to the utility power source, the activated breaking system configured to prevent rotation of the wheels of the transport unit.

3. The method of claim 1, wherein performing an action when the electrical power system is electrically connected to the utility power source includes:

communicating the instruction to a tow vehicle when the tow vehicle is attached to the refrigerated transport unit, the instruction configured to prevent the movement of the tow vehicle while the electrical power system of the refrigerated transport unit is electrically connected to the utility power source.

4. The method of claim 3, wherein the tow vehicle includes wheels and a braking system to prevent rotation of the wheels, and the method further including:

activating, based on the instruction to prevent movement of the refrigerated transport unit, the braking system to prevent movement of the tow vehicle while the electrical power system of the refrigerated transport unit is electrically connected to the utility power source.

5. The method claim 3, wherein the tow vehicle includes a prime mover for moving the tow vehicle along the ground, and the method further including:

preventing, based on the instruction to prevent movement of the refrigerated transport unit, the prime mover from providing movement to the tow vehicle while the electrical power system of the refrigerated transport unit is electrically connected to the utility power source.

6. A method for preventing drive off of a refrigerated transport unit, the refrigerated transport unit including a transport unit having an internal space for storing cargo and a transport climate control system to control an environmental condition of the internal space, the method comprising:

detecting whether an electrical power system of the refrigerated transport unit is electrically connected to a utility power source, the electrical power system configured to provide power to the transport climate control system; and generating, when the electrical power system is electrically connected to the utility power source, an instruction to prevent movement of the refrigerated transport unit while the electrical power system is electrically connected to the utility power source;

communicating the instruction to a docking port including an attachment arm for physically restraining the transport unit; and preventing, based on the instruction to prevent movement of the refrigerated transport unit, the attachment arm from being disengaged from the transport unit while the electrical power system is electrically connected to the utility power source.

7. The method of claim 3, further comprising:

determining a charge of a battery pack of the transport refrigeration unit, the battery pack configured to supply electrical power to the transport climate control system for controlling the environmental condition of the interior space; and generating the instruction when a charge of the battery pack is below a predetermined amount and the electrical power system is electrically connected to the utility power source.

8. The method of claim 3, further comprising:

communicating the instruction from the first transport refrigeration unit to a second transport refrigeration unit; and preventing movement of the first transport refrigeration unit and the second transport refrigeration unit with the instruction to prevent movement of the first transport refrigeration unit.

9. The method of claim 1, wherein generating the instruction to prevent movement of the transport refrigeration unit while the electrical power system is electrically connected to the utility power source includes:

generating a first instruction to prevent movement of the transport refrigeration unit when the electrical power system is electrically connected to the utility power source, and generating a second instruction to stop preventing movement of the transport refrigeration unit when the electrical power system is no longer electrically connected to the utility power source.

10. The method of claim 1, wherein performing an action when the electrical power system is electrically connected to the utility power source includes:

producing, a visual warning when the refrigerated transport unit is moved while the electrical power system is electrically connected to the utility power source.

11. The method of claim 10, wherein the visual warning is produced by a warning light disposed within a tow vehicle attached to the refrigerated transport unit.

12. The method of claim 1, wherein performing an action when the electrical power system is electrically connected to the utility power source includes:

producing an audible warning via a speaker when a tow vehicle attempts to move the transport refrigeration unit while the electrical power system is electrically connected to the utility power source.

13. The method claim 1, wherein performing an action when the electrical power system is electrically connected to the utility power source includes:
reporting, via a telematics unit, movement of the refrigerated transport unit that occurred while the electrical power system was electrically connected to the utility power source.

14. A drive off protection system comprising:
a refrigerated transport unit including:
a transport unit including an internal space for storing cargo,
a transport climate control system configured to control an environmental condition of the internal space,
an electric power system configured to receive external electrical power from a utility power source and provide electrical power to the transport climate control system, and
a controller monitoring the electrical power system, the controller configured to generate an instruction when the electrical power system is electrically connected to the utility power source, and the instruction configured to prevent movement of the refrigerated transport unit while the electrical power system is electrically connected to the utility power source.

15. The drive off protection system of claim 14, wherein the electrical power system includes a socket for receiving the external electrical power from the utility power source, and the controller detects a current supplied from the socket to determine whether the electrical power system is electrically connected to the utility power source.

16. The drive off protection system of claim 14, wherein the electrical power system includes a socket for receiving the external electrical power from the utility power source, and the controller is configured to sense a physical connection between an external power cord and the socket to determine whether the electrical power system is electrically connected to the utility power source.

17. The drive off protection system of claim 14, wherein the controller of the refrigerated transport unit is configured to communicate the instruction to a tow vehicle attached to the refrigerated transport unit, the tow vehicle including a controller for controlling the tow vehicle, and the instruction initiating the controller of the tow vehicle to prevent movement of the tow vehicle while the electrical power system of the refrigerated transport unit is electrically connected to the utility power source and the tow vehicle is attached to the refrigerated transport unit.

18. The drive off protection system of claim 17, wherein the tow vehicle includes a prime mover for moving the tow vehicle, and the instruction initiates the controller of the tow vehicle to prevent the prime mover from providing movement to the tow vehicle while the electrical power system of the refrigerated transport unit is electrically connected to the utility power source and the tow vehicle is attached to the refrigerated transport unit.

19. The drive off protection system of claim 14, further comprising:
a second refrigerated transport unit attached to the first refrigerated transport unit, the second refrigerated transport unit including:
a second transport unit including an internal space for storing cargo,
a second transport climate control system configured to control an environmental condition of the internal space of the second transport unit,
a second electric power system configured to receive external electrical power from the utility power source and provide electrical power to the second transport climate control system, and
a second controller monitoring the second electrical power system, the second controller generates an instruction to prevent movement of the second refrigerated transport unit when the second electrical power system is electrically connected to the utility power source, wherein
the second controller is configured to communicate the instruction generated by the second controller to the first controller of the first transport refrigeration unit.

20. The drive off protection system of claim 14, wherein the controller being configured to generate the instruction when the electrical power system is electrically connected to the utility power source includes:
the controller generating a first instruction to prevent movement of the transport refrigeration unit when the electrical power system is electrically connected to the utility power source, and
the controller generating a second instruction to stop preventing movement of the transport refrigeration unit when the electrical power system is no longer electrically connected to the utility power source.

21. The drive off protection system of claim 14, wherein the controller is configured to communicate the instruction to a docking port including an attachment arm for physically restraining the transport unit, the instruction configured to preventing the attachment arm from being disengaged from the transport unit while the electrical power system is electrically connected to the utility power source.

* * * * *